(12) United States Patent
Yamada

(10) Patent No.: US 8,548,232 B2
(45) Date of Patent: Oct. 1, 2013

(54) IMAGE PROCESSING APPARATUS, METHOD AND PROGRAM

(75) Inventor: Hideshi Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 308 days.

(21) Appl. No.: 13/043,960

(22) Filed: Mar. 9, 2011

(65) Prior Publication Data

US 2011/0229022 A1    Sep. 22, 2011

(51) Int. Cl.
*G06K 9/00*    (2006.01)

(52) U.S. Cl.
USPC .......................................... 382/162; 382/274

(58) Field of Classification Search
USPC ........................ 382/162, 167, 169, 225, 274
See application file for complete search history.

(56) References Cited

U.S. PATENT DOCUMENTS

| 4,731,671 A | * | 3/1988 | Alkofer | 382/274 |
| 7,386,185 B2 | * | 6/2008 | Watanabe et al. | 382/274 |
| 7,652,789 B2 | * | 1/2010 | Berns et al. | 358/1.9 |

FOREIGN PATENT DOCUMENTS

| JP | 2009-141678 | 6/2009 |
| JP | 2009-171176 | 7/2009 |

* cited by examiner

*Primary Examiner* — Phuoc Tran
(74) *Attorney, Agent, or Firm* — Finnegan, Henderson, Farabow, Garrett & Dunner, L.L.P.

(57) ABSTRACT

An image processing apparatus includes a circumstance vector generation unit configured to acquire information indicating circumstances, to digitize the information, and to generate a circumstance vector, a conversion parameter calculation unit configured to weighted-add several conversion parameters specified by the circumstance vector among a plurality of previously prepared conversion parameters for image conversion, and a converted image generation unit configured to perform image conversion using the conversion parameters obtained by the weighted-adding with respect to an original image to be processed so as to generate a converted image.

11 Claims, 17 Drawing Sheets

FIG. 15
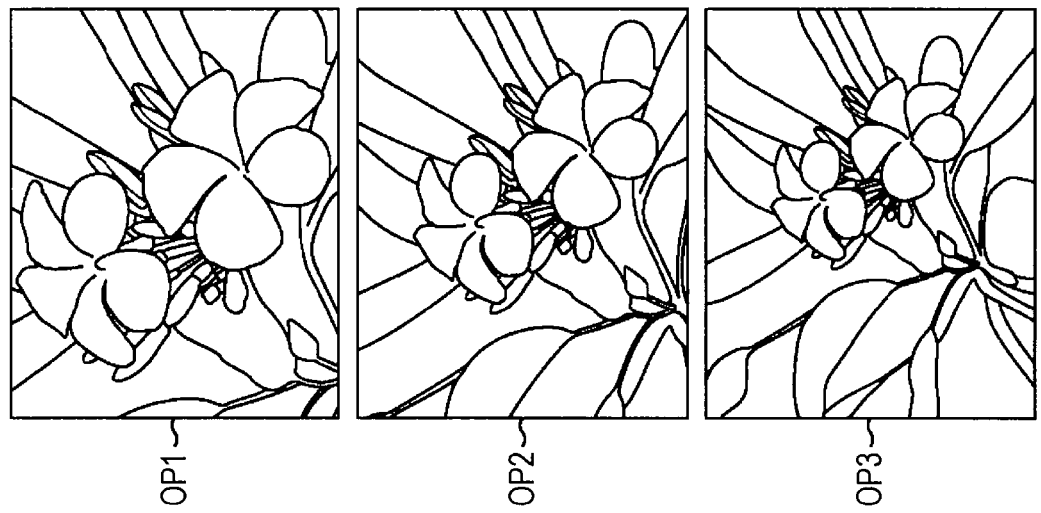
OP1  OP2  OP3
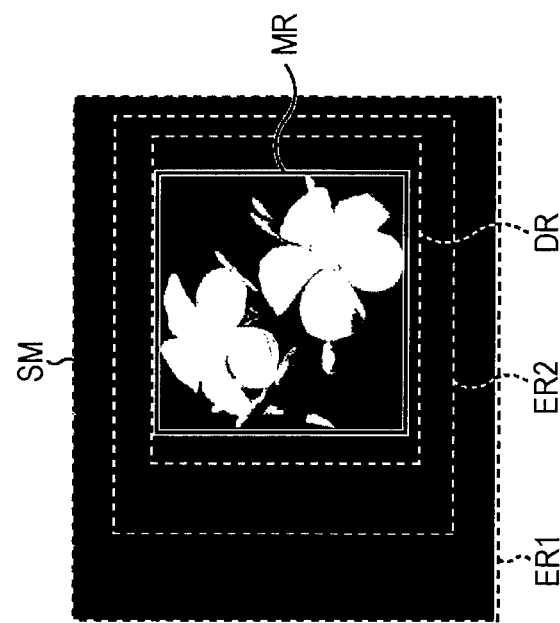
MR
SM
DR
ER2
ER1

IMAGE PROCESSING APPARATUS, METHOD AND PROGRAM

BACKGROUND OF THE INVENTION

1. Field of the Invention

The present invention relates to an image processing apparatus and method and a program and, more particularly, to an image processing apparatus and method and a program capable of more efficiently presenting an image to a user without a cumbersome operation.

2. Description of the Related Art

In the related art, an image reproduction apparatus called a digital photo frame for displaying an arbitrarily image selected from among images stored on a recording medium such as a flash memory or displaying images in a slide show, that is, sequentially displaying a plurality of images, is known.

Recently, an image reproduction apparatus for displaying not only images in a slide show but also images subjected to image conversion so as to enhance entertainment has been also proposed. For example, such an image reproduction apparatus, there is an apparatus for converting an image into a picture-like tone. In this image reproduction apparatus, an image is converted into an artistically expressed image such as a water-color painting mode or an oil painting mode designated by a user.

As a method of presenting an image, a method of graying a displayed image in a stepwise fashion with the passage of time from preparation of an image file (for example, see Japanese Unexamined Patent Application Publication No. 2009-141678) or a method of performing color conversion of an image so as to achieve a tone close to a model image obtained by keyword retrieval (for example, see Japanese Unexamined Patent Application Publication No. 2009-171176).

SUMMARY OF THE INVENTION

However, in the method of converting the image into the picture-like tone, inconveniently a user has to set an image conversion mode point by point. In this method, the image conversion mode may be automatically set as sequential or random. However, in this case, a mode suitable for the image viewing environment may not be selected.

In the method of graying and displaying the image in the stepwise fashion, the user knows the passage of time intuitively, but the image may not be efficiently displayed. In the method of performing color conversion of the image using the model image, a user inputs a keyword using a keyboard or the like so as to perform retrieval and finds a desired image from among many images. Thus, a cumbersome operation is necessary.

It is desirable to more efficiently present an image to a user without a cumbersome operation.

According to an embodiment of the present invention, there is provided an image processing apparatus including: a circumstance vector generation means for acquiring information indicating circumstances, to digitize the information, and to generate a circumstance vector; a conversion parameter calculation means for weighted-adding several conversion parameters specified by the circumstance vector among a plurality of previously prepared conversion parameters for image conversion; and a converted image generation means for performing image conversion using the conversion parameters obtained by the weighted-adding with respect to an original image to be processed so as to generate a converted image.

The converted image generation means may perform at least one of a tone correction process or a geometric change process as the image conversion.

The conversion parameters may be information indicating a target color distribution, and the converted image generation means may generate the converted image by performing tone correction with respect to the original image such that a color distribution of the original image becomes the target color distribution.

The information indicating the target color distribution may include information defined by a target three-dimensional Gaussian model, and the converted image generation means may obtain the position of a normalized target eigenvector space of the target three-dimensional Gaussian model, which corresponds to the position of a target pixel of the original image of a normalized eigenvector space of a three-dimensional Gaussian model representing the color distribution of the original image and specify the position of the target pixel of the target eigenvector space before normalization from that position so as to calculate a pixel value of the target pixel after the tone correction.

The conversion parameter calculation means may record a database including positional information representing positions or regions, with which the conversion parameters are associated, in the circumstance vector space including the conversion parameters and the circumstance vector, and weighted-add the conversion parameters, with which a predetermined number of positions or regions are associated, located in vicinity of an end point of the circumstance vector generated by the circumstance vector generation means, among positions or regions represented by the positional information.

The conversion parameter calculation means may generate information indicating the target color distribution based on learning images with metadata as the conversion parameters, generate the circumstance vector from the metadata, and associate the conversion parameters obtained from the learning images with the positions or regions of the circumstance vector space.

The conversion parameter calculation means may specify the weighted-added conversion parameters using the circumstance vector in which weighting is applied to each component.

The converted image generation means may include a subject map generation means configured to extract a feature amount of a predetermined feature from the original image and to generate a subject map representing subject likeness of each region of the original image, a subject specifying means for specifying a subject region including a subject of the original image using the subject map, and a display region determination means cropping a region of the original image including the subject region and having a size or shape decided by the conversion parameters and to set the region as the converted image.

According to another embodiment of the present invention, there is an image processing method or program including: acquiring information indicating circumstances, digitizing the information, and generating a circumstance vector; weighted-adding several conversion parameters specified by the circumstance vector among a plurality of previously prepared conversion parameters for image conversion; and performing image conversion using the conversion parameters obtained by the weighted-adding with respect to an original image to be processed so as to generate a converted image.

In an embodiment of the present invention, information indicating circumstances is acquired, the information is digitized, and a circumstance vector is generated, several conversion parameters specified by the circumstance vector among a plurality of previously prepared conversion parameters for image conversion are weighted-added, and image conversion is performed using the conversion parameters obtained by the weighted-adding with respect to an original image to be processed, thereby generating a converted image.

According to an embodiment of the present invention, it is possible to more efficiently present an image to a user without a cumbersome operation.

BRIEF DESCRIPTION OF THE DRAWINGS

FIG. 15 is a diagram illustrating generation of a converted image;

DESCRIPTION OF THE PREFERRED EMBODIMENTS

Figure 1:
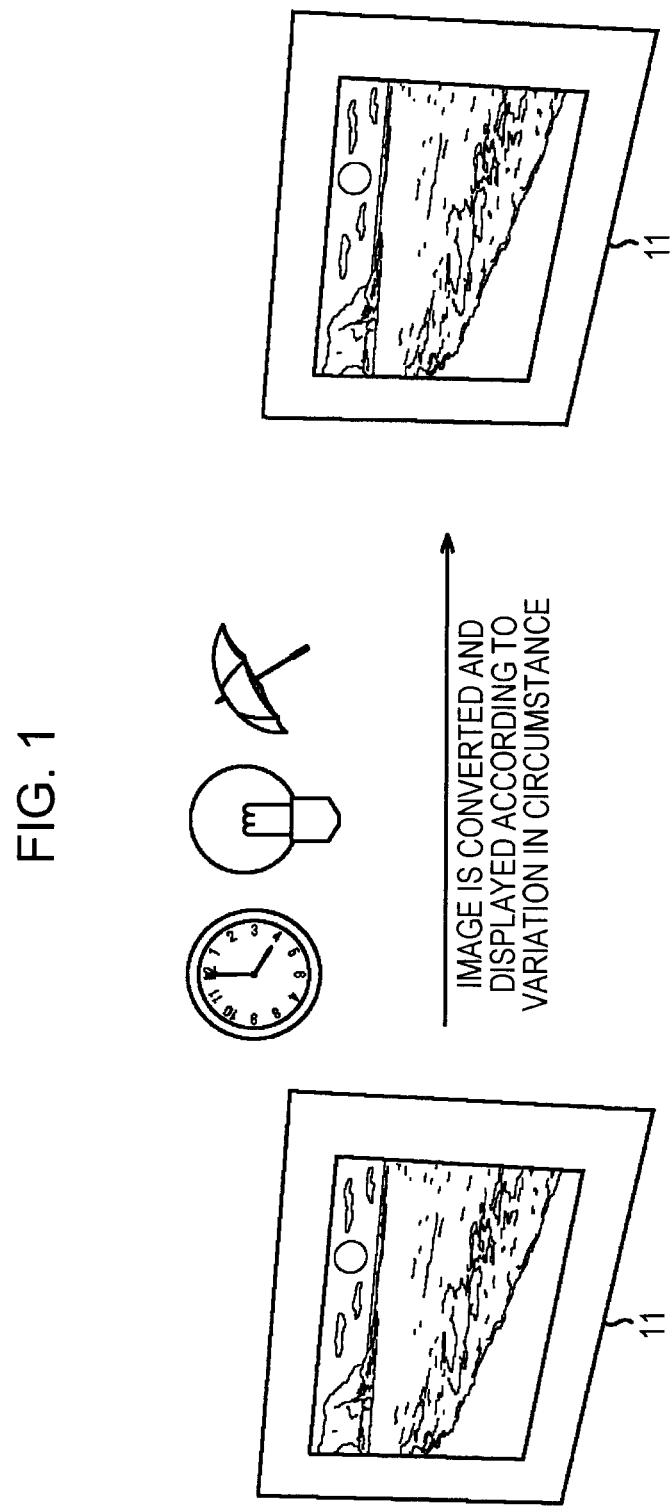
FIG. 1 is a diagram illustrating the outline of an image processing apparatus according to the present invention.

Hereinafter, embodiments of the present invention will be described with reference to the drawings.
Outline of Image Processing Apparatus As shown in FIG. 1, an image processing apparatus 11 according to the present invention performs a conversion process with respect to an image according to circumstances of the image processing apparatus 11, that is, current circumstances in which the image processing apparatus 11 is placed, and presents an image obtained as the result to a user.

Figure 2:
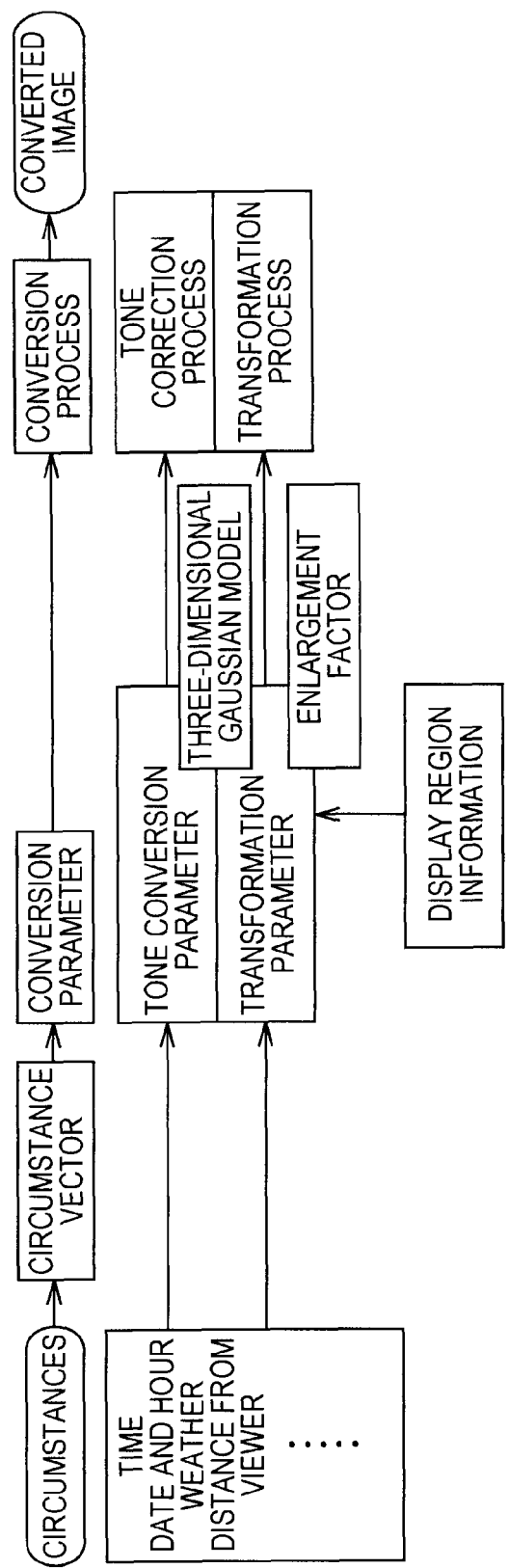
FIG. 2 is a diagram illustrating conversion of an original image by an image processing apparatus.

The circumstances of the image processing apparatus 11 refer to date and time, a day of the week, weather, season, temperature, the distance from the image processing apparatus 11 to a user, peripheral brightness and the like as shown on the left side of FIG. 2, and the image processing apparatus 11 acquires information indicating such circumstances and generates a circumstance vector. This circumstance vector includes digitized elements obtained by digitizing elements such as time and the user viewing distance as the circumstances.

The image processing apparatus 11 selects a conversion parameter used to convert an image (hereinafter, referred to as an original image) to be displayed using the generated circumstance vector. For example, as shown on the central portion of FIG. 2, if tone conversion is performed with respect to the original image, a conversion parameter is a tone conversion parameter for specifying a three-dimensional Gaussian model representing color distribution of an image.

For example, the tone of the original image is corrected to a tone corresponding to the current time by this tone conversion parameter. In particular, if the current time is evening or night, the tone of the original image is corrected to a tone such as a photo of a sunset or a night scene.

If a geometric change process is performed with respect to the original image, the conversion parameter is a conversion parameter representing an enlargement factor for specifying a region of the original image displayed after the change process. For example, by this change parameter, the original image is enlarged to a scale factor corresponding to a distance (hereinafter, referred to as a viewing distance) from the image processing apparatus 11 to the user.

In the selection of the change parameter, display region information representing specification of a display unit for displaying not only the circumstance vector but also the changed image or the like may be used.

If the conversion parameter is selected, the image processing apparatus 11 performs the conversion process with respect to the original image using the conversion parameter. In particular, the tone correction process using the tone conversion parameter as the conversion parameter, the change process using the change process as the conversion parameter or the like is performed. If the original image is converted into the converted image using such a conversion process, the image processing apparatus 11 displays the obtained converted image.

The image processing apparatus 11 acquires information indicating the current circumstances, generates a circumstance vector, converts the original image into the converted image using the conversion parameter specified by the circumstance vector, and displays the converted image.

The image processing apparatus 11 performs image conversion suitable to the circumstances using the conversion parameter decided by the circumference vector so as to display an image with a diversified variation while preventing a user from becoming bored. Since a conversion parameter is selected from the circumstance vector, it is possible to more simply and efficiently display a converted image to a user without a cumbersome operation for specifying a conversion parameter.

Since a conversion parameter is selected from a circumstance vector, it is possible to efficiently and consistently associate various circumstances such as time, weather, temperature or presence/absence of a viewer with a conversion process decided by a conversion parameter.

The conversion process of the original image is not limited to tone conversion (tone correction) or geometric change and any conversion process may be performed. A plurality of conversion processes such as tone correction and geometric change may be performed as a conversion process so as to generate a converted image.

First Embodiment

Configuration of Image Processing Apparatus

Figure 3:
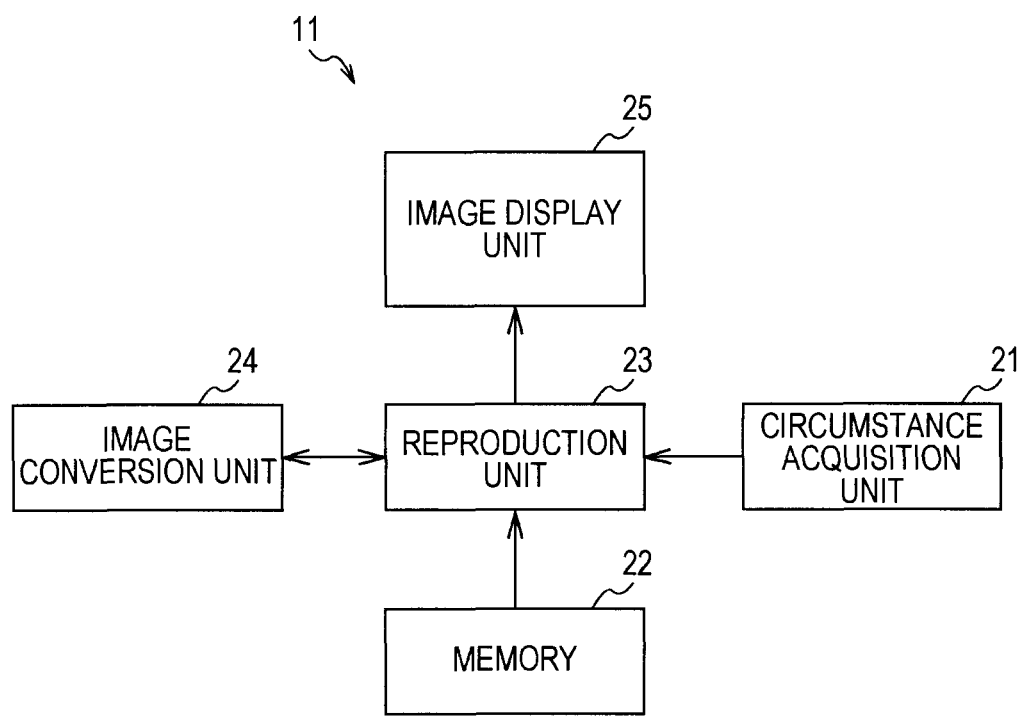
FIG. 3 is a diagram showing a configuration example of an image processing apparatus according to an embodiment of the present invention.

Next, the detailed configuration example of the image processing apparatus 11 will be described. FIG. 3 is a diagram showing the configuration example of the image processing apparatus 11.

The image processing apparatus 11 includes, for example, a digital photo frame and the like, and includes a circumstance acquisition unit 21, a memory 22, a reproduction unit 23, an image conversion unit 24 and an image display unit 25.

The circumstance acquisition unit 21 includes, for example, a watch, a thermometer, an illuminometer, a hygrometer, a Global Positioning System (GPS) device, an electronic compass, a camera, a sensor, and the like. The circumstance acquisition unit 21 measures a user viewing distance or acquires weather of the current time of a region in which the image processing apparatus 11 is located from a device such as a server through a network (not shown) so as to generate a circumference vector and supplies the circumstance vector to the reproduction unit 23.

The memory 22 is a non-volatile recording medium which records an original image. The reproduction unit 23 includes, for example, a microprocessor and the like and controls the overall operation of the image processing apparatus 11. For example, the reproduction unit 23 acquires a conversion parameter using the circumstance vector from the circumstance acquisition unit 21, and supplies the conversion parameter and the original image read from the memory 22 to the image conversion unit 24 so as to acquire circumstances and to generate a converted image. The reproduction unit 23 supplies the converted image acquired from the image conversion unit 24 to the image display unit 25 so as to display the converted image.

The image conversion unit 24 receives the conversion parameter and the original image from the reproduction unit 23, converts the original image into the converted image using the conversion parameter, and supplies the converted image to the reproduction unit 23. The image display unit 25 includes, for example, a liquid crystal display and displays the converted image supplied from the reproduction unit 23.

Configuration of Image Conversion Unit

Figure 4:
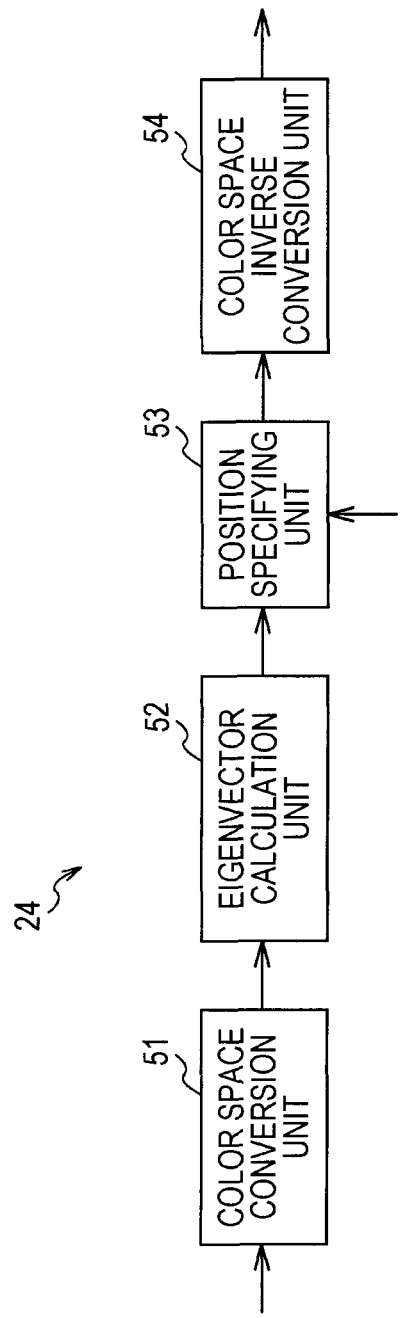
FIG. 4 is a diagram showing a configuration example of an image conversion unit.

The image conversion unit 24 of FIG. 3 has a configuration shown in FIG. 4.

The image conversion unit 24 includes a color space conversion unit 51, an eigenvector calculation unit 52, a position specifying unit 53, and a color space inverse conversion unit 54.

The color space conversion unit 51 converts a color space of the original image supplied from the reproduction unit 23 and supplies the color space to the eigenvector calculation unit 52. The eigenvector calculation unit 52 obtains a three-dimensional Gaussian model of the original image after color space conversion supplied from the color space conversion unit 51, calculates an eigenvalue and an eigenvector of the obtained three-dimensional Gaussian model, and supplies the original image, the eigenvalue and the eigenvector to the position specifying unit 53.

The position specifying unit 53 performs mapping a pixel value of each pixel of the original image using the original image, eigenvalue and eigenvector from the eigenvector calculation unit 52 and the conversion parameter from the reproduction unit 23 and supplies the obtained mapped original image to the color space inverse conversion unit 54. The color space inverse conversion unit 54 inversely converts the original image from the position specifying unit 53 into an original color space and supplies the obtained converted image obtained as the result to the reproduction unit 23.

Description of Image Conversion Process

Next, the operation of the image processing apparatus 11 will be described.

A user may select any one of a fixed display mode, a slide show mode, and an automatic conversion mode as a display mode, if an image is displayed by the image processing apparatus 11.

The user may manipulate a button (not shown) provided on a side of the casing of the image processing apparatus 11 so as to set a display mode and record the setting in the reproduction unit 23. Thus, it is possible to reduce the image in the set display mode even when the display mode is not set point by point while reproducing the image. The setting of the display mode is not limited to button manipulation and may be performed by manipulation of a remote controller.

For example, if the user instructs start of the display of the image, the reproduction unit 23 begins image reproduction in the recorded display mode. In particular, if the fixed display mode is set, the reproduction unit 23 reads one original image designated by the user from the memory 22 and supplies and displays the original image to and on the image display unit 25. That is, in the fixed display mode, the original image designated by the user is continuously displayed without change.

If the slide show mode is set, the reproduction unit 23 sequentially reads original images from the memory 22 and supplies and displays the original images to and on the image display unit 25. Then, the original images are sequentially displayed in the slide show mode.

If the automatic conversion mode is set, the image processing apparatus 11 performs an image conversion process so as to convert the original images into converted images and displays the converted images in the slide show mode. Hereinafter, the image conversion process of the image processing apparatus 11 will be described with reference to the flowchart of FIG. 5.

In step S11, the reproduction unit 23 reads the original image to be displayed from the memory 22.

In step S12, the circumstance acquisition unit 21 acquires the information indicating the circumstances of the image processing apparatus 11 at the current time, and generates and supplies a circumstance vector to the reproduction unit 23.

For example, the circumstance acquisition unit 21 allocates numerical values of 0 to 100 to times from 0 to 24 as components of the circumstance vector when the current time is acquired as circumstances.

Peripheral weather of the image processing apparatus 11 at the current time may be set as components of the circumstance vector. In this case, for example, values "0", "50" and "100" for the weather component of the circumstance vector may be allocated to "fair", "cloudy" and "rainy" weather, respectively. Accordingly, for example, if information indicating "rainy" as the weather for a region in which the image processing apparatus 11 is provided is acquired through a wired or wireless network, the circumstance acquisition unit 21 generates a circumstance vector having a value "100" as the weather component.

Dates from January 1 to December 31 may be digitized and the current date may be set as a component of the circumstance vector. In this case, for example, the value of the date component is set to "0" if the date is January 1, is set to "100" if the date is December 31, and is set to any one in a range from 0 to 100 as the value of the component of the circumstance vector if the date is another date.

The range of the value of each component of the circumstance vector is arbitrarily set. If circumstances of the image processing apparatus 11 are indicated, any component of the circumstance vector such as temperature or moisture, latitude/longitude of the image processing apparatus 11, orientation of an electronic compass, or the like may be used.

In step S13, the reproduction unit 23 acquires the conversion parameter using the circumstance vector supplied from the circumstance acquisition unit 21.

In particular, a database in which conversion parameters are associated with points (hereinafter, referred to as arrangement points) within a multi-dimensional circumstance vector space defined by the circumstance vector is recorded in a Read Only Memory (ROM) (not shown) provided in the reproduction unit 23 in advance. That is, this database includes information indicating arrangement points in which previously prepared conversion parameters are associated with conversion parameters in the circumstance vector space including a set of circumstance vectors.

The reproduction unit 23 calculates a Euclidean distance between such an arrangement point and a position indicated by the circumstance vector, that is, an end point of the circumstance vector, by referring to the database, and selects a conversion parameter associated with an arrangement point having the shortest Euclidean distance.

Figure 6:
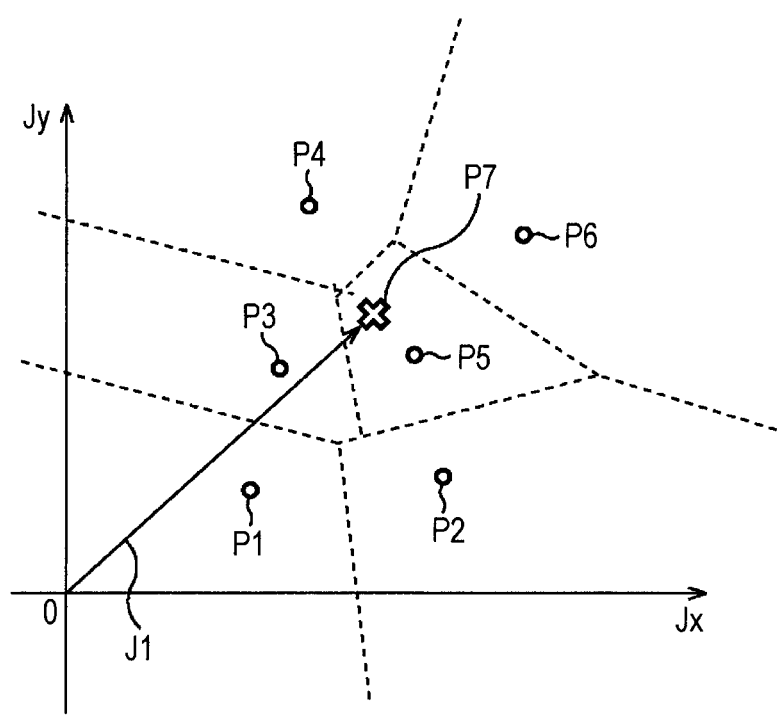
FIG. 6 is a diagram illustrating acquisition of a conversion parameter.

For example, as shown in FIG. 6, a circumstance vector J1 is a two-dimensional vector including a component Jx and a component Jy. In the example of FIG. 6, conversion parameters are associated with an arrangement point P1 to an arrangement point P6 of a two-dimensional circumstance vector space including the component Jx and the component Jy and having an original point O as a reference.

At this time, the reproduction unit 23 selects a conversion vector associated with an arrangement point closest to a point (position) indicated by the circumstance vector J1 in the circumstance vector space from among the arrangement point P1 to the arrangement point P6 associated with the conversion parameters. In the example of FIG. 6, since the circumstance vector J1 is a vector having the original point O as a start point and a point P7 as an end point, a conversion parameter associated with the arrangement point P5 closest to the point P7 is selected.

In FIG. 6, dotted lines surrounding the arrangement point P1 to the arrangement point P6 indicate boundary lines located at the same distance from two adjacent arrangement points. Accordingly, if the end point of the circumstance vector J1 is within a region surrounded by these boundary lines, a conversion parameter corresponding to an arrangement point within the region is selected.

If a component (hereinafter, referred to as a cyclic component) having a cyclic value is present in the circumstance vector, the distance between the components of the circumstance vector and the arrangement point may be obtained as follows with respect to the cyclic component, upon the selection of the conversion parameter.

That is, the reproduction unit 23 obtains the absolute value of the difference between values of the cyclic component of the end point of the circumstance vector and the arrangement point as a general subtraction result. Next, the reproduction unit 23 adds the maximum value of a range of a value, which may be taken by the cyclic component, to the smaller of the values of the cyclic component of the end point of the circumstance vector and the arrangement point, and the absolute value of the difference between the values of the cyclic component is obtained as a subtraction result after correction. The reproduction unit 23 uses the smaller of the general subtraction result and the subtraction result after correction as the distance of the cyclic component.

In particular, if the cyclic component is a value from 0 to 24 indicating the current time and the value of each time is the value of the cyclic component, 00:00 and 24:00 have the same value.

For example, if a difference between 01:00 and 23:00 is obtained, the difference becomes 22 (a distance of 22 hours). But, in practice, the difference becomes 2 (a distance of 2 hours). Accordingly, if the maximum value 24 (24:00) which may be taken by the cyclic component is added to 1 o'clock which is the smaller of 1 o'clock and 23:00 and then a difference between 1 o'clock and 23:00 is obtained, |(1+24)−23|=2 (a distance of 2 hours) is obtained and the correct distance of the cyclic component may be obtained.

As such a cyclic component, the distance of an angle obtained by an electronic compass or a gyro sensor may be considered in addition to the time. In addition, information indicating whether or not each component of the circumstance vector is a cyclic component is recorded in the reproduction unit 23 in advance as an attribute of the component of the circumstance vector.

Although a conversion parameter corresponding to one arrangement point closest to the end point of the circumstance vector is selected in the above description, a final conversion parameter from conversion parameters of a plurality of arrangement points may be calculated.

For example, the conversion parameters of the plurality of arrangement points near the end point of the circumstance vector may be weighted-averaged (weighted-added) according to the distance from the end point of the circumstance vector and set as final conversion parameters. In this case, for example, as the distance from the end point of the circumstance vector is short, a conversion parameter of an arrangement point of a predetermined number is weighted-added. Values obtained by weighted-averaging the conversion parameters of all arrangement points according to the distance from the arrangement points to the end point of the circumstance vector may be final conversion parameters.

If an arrangement point, a distance of which from the end point of the circumstance vector is less than a predetermined threshold value, is not present, a conversion parameter which is not subjected to a conversion process (tone correction) may be selected. In this case, the converted image becomes the original image.

A weight may be applied to each component of the circumstance vector such that a specific component becomes important. For example, if all components of the circumstance vector have the same weight, a weight "1" is applied to each component and, if a specific component is desired to be ignored, a weight of "0" is applied to the component. Such a weight may be used to compute the Euclidean distance between the end point of the circumstance vector and the arrangement point and the distance of each component is divided by the weight such that a target three-dimensional Gaussian model as a selected conversion parameter may be adjusted. In particular, even when a distance "10" of a predetermined component is obtained before weight multiplication, if the weight is 1, the final distance becomes 10 (=10/1), but, if the weight is 0.5, the final distance becomes 20 (=10/0.5). Thus, closeness of the distance using a circumstance vector component having a large weight becomes important.

Although the distance between the end point of the circumstance vector and the arrangement point becomes the Euclidean distance in the above description, it may be a Mahalanobis distance. In this case, in the circumstance vector space, the conversion parameters are arranged with spatial expansion such as a Gaussian function instead of points and the conversion parameter having the shortest Mahalanobis distance from the end point of the circumstance vector is selected.

Figure 5:
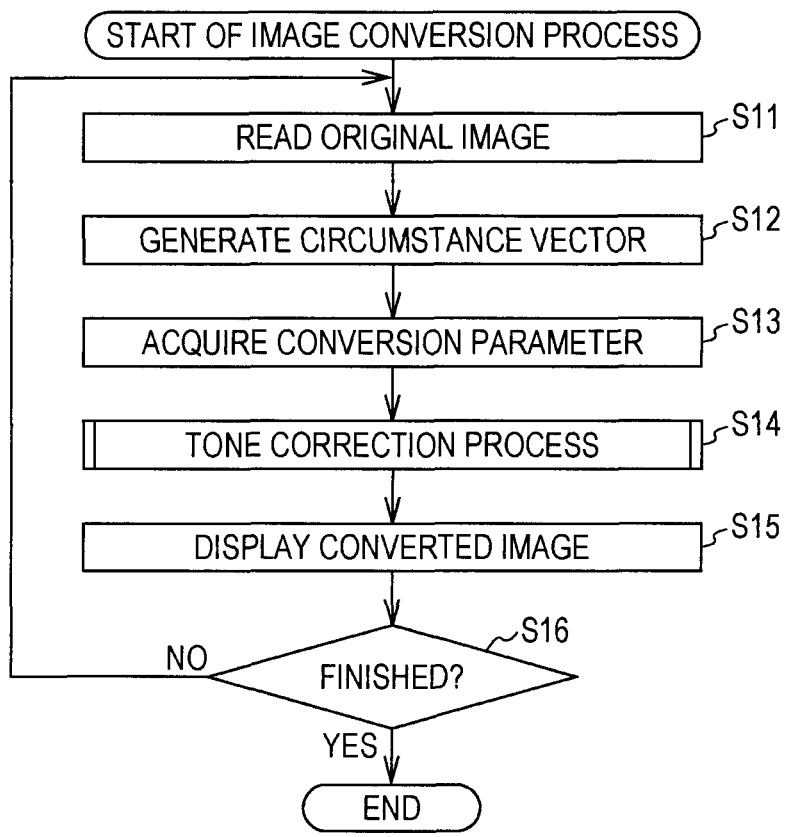
FIG. 5 is a flowchart illustrating an image conversion process.

Returning to the description of the flowchart of FIG. 5, if the conversion parameter is acquired in step S13, the reproduction unit 23 supplies the conversion parameter and the original image read from the memory 22 to the image conversion unit 24 and then the process proceeds to step S14.

In step S14, the image conversion unit 24 performs a tone correction process and converts the original image from the reproduction unit 23 into the converted image using the conversion parameter supplied from the reproduction unit 23. The image conversion unit 24 supplies the obtained converted image to the reproduction unit 23.

For example, it is assumed that a conversion parameter is a covariance matrix representing an average value of pixel values of pixels of an image and a variance of pixel values of such pixels, which defines a target three-dimensional Gaussian model (hereinafter, referred to as a target three-dimensional Gaussian model). In this case, the image conversion unit 24 obtains a three-dimensional Gaussian model of a color distribution of the original image and performs tone correction of the original image using the obtained three-dimensional Gaussian model and the target three-dimensional Gaussian model. That is, the tone of the pixel value of each pixel of the original image is corrected such that the color distribution of the converted image becomes a distribution represented in the target three-dimensional Gaussian model.

In other words, the conversion parameter is a parameter for modifying the three-dimensional Gaussian model representing the color distribution of the original image to a desired shape, the three-dimensional Gaussian model is modified based on the conversion parameter, and the color of the original image is changed according to the modification. Details of the tone correction process will be described below.

In step S15, the reproduction unit 23 supplies and displays the converted image supplied from the image conversion unit 24 to and on the image display unit 25. Thus, the original image, the tone of which is corrected using the conversion parameter, that is, the converted image obtained by image conversion, is displayed on the image display unit 25.

In step S16, the reproduction unit 23 determines whether or not the process is finished. For example, if the user manipulates the image processing apparatus 11 so as to instruct the image displaying process to be finished, it is determined that the process is finished.

In step S16, if it is determined that the process is not finished, the process returns to step S11 and the above-described process is repeated. That is, a next original image is read, is subjected to tone correction, and is displayed. Accordingly, in the image conversion process, the original image, the tone of which is corrected, is displayed in a slide show mode until the process is instructed to be finished.

In contrast, if it is determined that the process is finished in step S16, each unit of the image processing apparatus 11 stops the process and the image conversion process is finished.

In this way, the image processing apparatus 11 acquires information indicating circumstances, generates a circumstance vector, and selects a conversion parameter suitable for current circumstances using the circumstance vector. The image processing apparatus 11 converts an original image into a converted image using the conversion parameter and displays the converted image.

Accordingly, the image processing apparatus 11 may specify a conversion parameter according to circumstances without enabling a user to perform any operation. Thus, it is possible to perform tone correction suitable to the circumstances with respect to the original image so as to obtain converted images with a diversified variation and, as a result to, more efficiently present the original image.

Description of Tone Correction Process

Next, a tone correction process corresponding to the process of step S14 of FIG. 5 will be described with reference to the flowchart of FIG. 7.

In step S41, the color space conversion unit 51 converts pixel values of pixels of the original image supplied from the reproduction unit 23 into pixel values of $L\alpha\beta$ space.

Here, the $L\alpha\beta$ space is a three-dimensional color space including a luminance component L and components $(\alpha, \beta)$ of a tone (color). For example, if the pixel value of the pixel of the original image includes values of the components of the respective colors of R (red), G (green) and B (blue), the pixel value of the pixel of the original image is converted from the values of the components of R, G and B into the values of the components of L, $\alpha$ and $\alpha$. The color space conversion unit 51 supplies the original image converted from the image of the RGB space into the image of the $L\alpha\beta$ space to the eigenvector calculation unit 52.

Conversion from the RGB space into the $L\alpha\beta$ space is, for example, described in "High Dynamic Range Imaging: Acquisition, Display, and Image-Based Lighting (The Morgan Kaufmann Series in Computer Graphics), Erik Reinhard, Greg Ward, Sumanta Pattanaik, Paul Debevec", and a coefficient used for conversion from the RGB space into the $L\alpha\beta$ space is appropriately changeable.

Such conversion of the color space is advantageous in that mapping to a three-dimensional space (color space) with low correlation between components is performed such that corruption of the image obtained as the result is reduced even when values of three axes (values of components) are independently converted. For example, if the original image is converted into the $L\alpha\beta$ space, even when the luminance component of the pixel is changed, the converted image does not become unnatural by only changing the brightness of the pixel without substantially influencing the $\alpha$ component and the $\beta$ component. In addition, without performing conversion of the color space of the original image, processing may be performed using the color space of the original image, such as R, G and B or Y, Cb and Cr, without change.

In step S42, the eigenvector calculation unit 52 obtains a three-dimensional Gaussian model representing the color distribution of the original image using the original image supplied from the color space conversion unit 51. That is, an average value and a covariance matrix of the pixel value of the pixel of the original image are calculated.

In step S43, the position specifying unit 53 sets the three-dimensional Gaussian model defined by the average value and the covariance matrix of the pixel values as the conversion parameter supplied from the reproduction unit 23 as a target three-dimensional Gaussian model after conversion of the three-dimensional Gaussian model of the original image.

In step S44, the eigenvector calculation unit 52 calculates the eigenvalue and the eigenvector of the three-dimensional Gaussian model of the original image based on the covariance matrix of the original image and supplies the original image, the eigenvalue and the eigenvector to the position specifying unit 53.

Here, the eigenvector is represented by the components of the $L\alpha\beta$ space, that is, the components of L, $\alpha$ and $\beta$ (specifically, a linear coupling of the components of L, $\alpha$ and $\beta$). For example, if an eigenvector u, an eigenvector v and an eigenvector w are obtained as the eigenvector, a three-dimensional eigenvector space of the original image is defined from such eigenvectors and eigenvalues. That is, a space including eigenvectors having lengths of the eigenvalues is an eigenvector space. Hereinafter, values of components of the eigenvector u, the eigenvector v and the eigenvector w of a certain point in the eigenvector space, that is, coordinates (position) of the point, are represented by (u, v, w).

In step S45, the position specifying unit 53 calculates the position (u, v, w) of the eigenvector space of the pixel of the original image, that is, the pixel value of the pixel, using the original image, the eigenvalue and the eigenvector from the eigenvector calculation unit 52. Since each pixel of the original image has the components of L, $\alpha$ and $\beta$ as the pixel values, the values of the components of u, v and w of the eigenvector space are obtained from the values of such components.

In step S46, the position specifying unit 53 calculates the position (u', v', w') of the eigenvector space (hereinafter, referred to as a target eigenvector space) of the target three-dimensional Gaussian model of the pixel from the obtained position (u, v, w) of the eigenvector space of each pixel of the original image.

In particular, the position specifying unit 53 normalizes the eigenvector space of the three-dimensional Gaussian model of the original image and calculates the position (ru, rv, rw) of the pixels of the eigenvector space after normalization from the position (u, v, w) of the pixels of the eigenvector space.

The position specifying unit 53 obtains the eigenvector and the eigenvalue of the target three-dimensional Gaussian model from the covariance matrix of the target three-dimensional Gaussian model and normalizes the target eigenvector space defined from the eigenvector and the eigenvalue.

Here, the values of the components of the eigenvector u', the eigenvector v' and the eigenvector w' of a certain point of the target eigenvector space, that is, the coordinates (position) of the point, are denoted by (u', v', w'). The position (coordinate) of a certain point of the target eigenvector space after normalization is denoted by (ru', rv', rw').

The components u', v' and w' of the target eigenvector space and the components ru', rv' and rw' of the target eigenvector space after normalization are expressed by the components L, $\alpha$ and $\beta$ of the L$\alpha\beta$ space, respectively. Accordingly, each of the components ru', rv' and rw' of a certain position of the target eigenvector space after normalization may be expressed using the component ru, ry and rw of the eigenvector space after normalization.

Accordingly, the position specifying unit 53 calculates the position (ru', rv', rw') of the pixel of the target eigenvector space after normalization from the position (ru, rv, rw) of the pixel of the eigenvector space after normalization, with respect to each pixel of the original image.

The position specifying unit 53 calculates the position (u', v', w') of each pixel of the original image of the target eigenvector space before normalization from the position (ru', rv', rw') of each pixel of the original image of the target eigenvector space after normalization.

In step S47, the position specifying unit 53 calculates the position of the L$\alpha\beta$ space of the pixel, that is, the values of the components of L, $\alpha$ and $\beta$, from the position (u', v', w') of the pixel of the target eigenvector space, with respect to each pixel of the original image. The obtained values of the components of L, $\alpha$ and $\beta$ are the pixel value of the L$\alpha\beta$ space of the pixel, that is, the tone-corrected pixel value.

The image including the pixels obtained as described above is an image having a target three-dimensional Gaussian distribution as a color distribution and this image is a converted image. That is, through the mapping process of the pixel based on the target three-dimensional Gaussian model specified by the conversion parameter, the original image is converted into the converted image having a color distribution represented in the target three-dimensional Gaussian model.

The processes of the above-described steps S42 to S47 will now be described, concentrating on the two-dimensional component.

Figure 8:
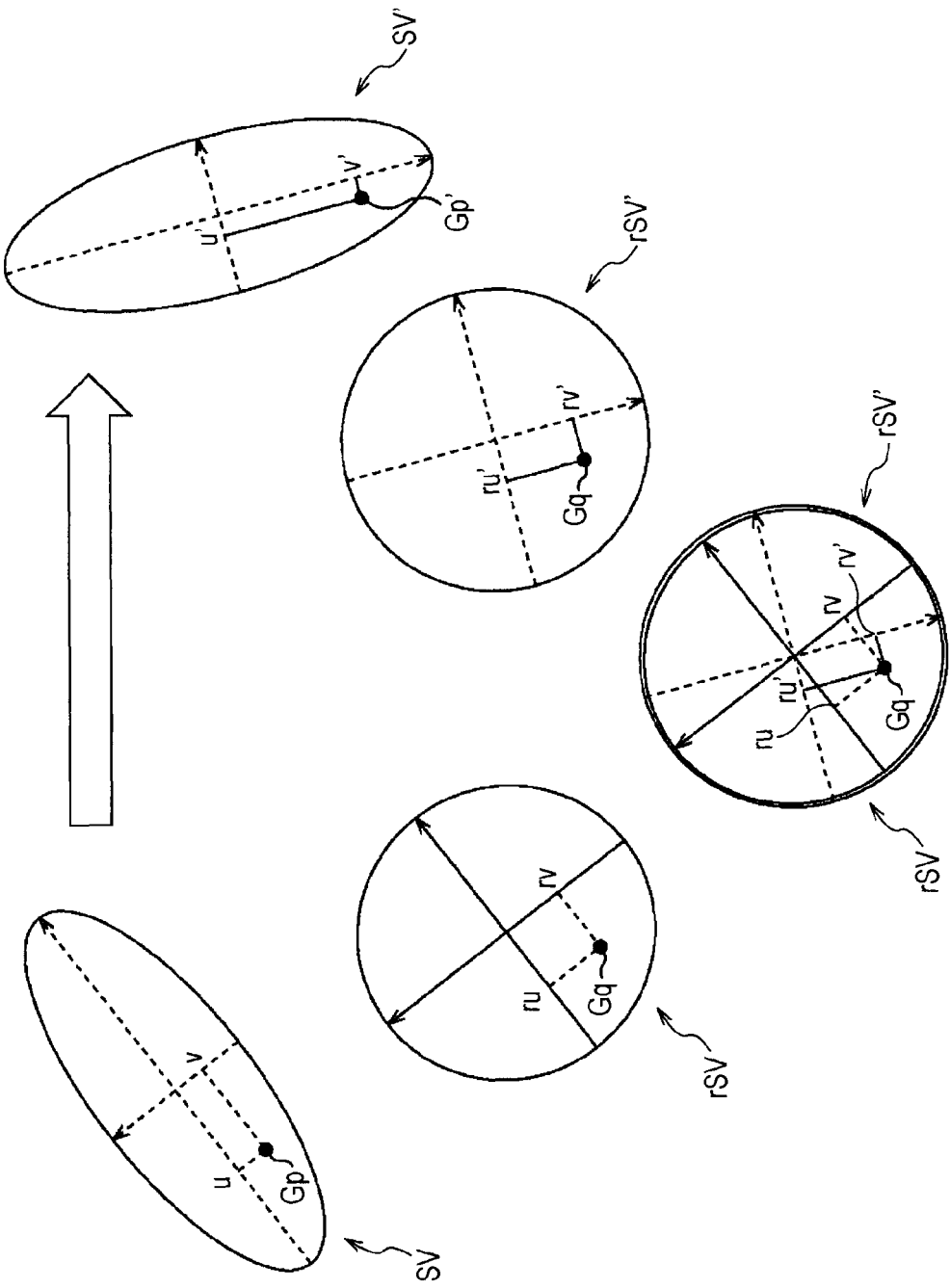
FIG. 8 is a diagram illustrating tone correction.

That is, for example, as shown on the left upper side of FIG. 8, it is assumed that an eigenvector space SV is obtained from the three-dimensional Gaussian model of the original image. This eigenvector space SV includes an eigenvector u having an eigenvalue as a length and an eigenvector v having an eigenvalue as a length.

In the figure, two axes (arrows) of the eigenvector space SV represent the eigenvector u and the eigenvector v each having the eigenvalue as the length and an ellipse representing the eigenvector space SV represents an approximate distribution state of the color of the pixel of the original image.

A pixel Gp (point Gp) expressed by the coordinates (u, v) of the eigenvector space SV among the pixels of the original pixel is mapped to a target eigenvector space SV' shown on the right upper side of the figure.

The target eigenvector space SV' includes the eigenvector u' and the eigenvector v' each having the eigenvalue as the length obtained from the target three-dimensional Gaussian model specified by the conversion parameter. In addition, two axes (arrows) of the eigenvector space SV' represent the eigenvector u' and the eigenvector v' each having the eigenvalue as the length and an ellipse representing the eigenvector space SV' represents an approximate distribution state of the color of the pixel of the original image represented in the target three-dimensional Gaussian model.

First, the position specifying unit 53 normalizes the eigenvector space SV and the target eigenvector space SV' such that the eigenvectors configuring such vector spaces have the same length. Thus, it is possible to obtain the eigenvector space rSV and the target eigenvector space rSV' after normalization.

Two axes (arrows) of the eigenvector space rSV and the target eigenvector space rSV' represent the normalized eigenvector u and eigenvector v and the normalized eigenvector u' and eigenvector v'.

Hereinafter, the eigenvector u and eigenvector v after normalization are respectively referred to as an eigenvector ru and an eigenvector rv, and the eigenvector u' and eigenvector v' after normalization are respectively referred to as an eigenvector ru' and an eigenvector rv'.

In the eigenvector space SV and the target eigenvector space SV', since the eigenvectors are orthogonal, normalization of the eigenvector space unifies the eigenvectors into a unit circle. Thus, the eigenvector space rSV and the target eigenvector space rSV' become vector spaces having the same size.

Next, the position specifying unit 53 obtains the position of the eigenvector space rSV of the point Gp represented by the coordinates (u, v) of the eigenvector space SV. As a result, for example, it is assumed that a point Gq represented by coordinates (ru, rv) is obtained as the point of the eigenvector space rSV corresponding to the point Gp.

If the point Gq is obtained, the position specifying unit 53 overlaps the eigenvector space rSV and the target eigenvector space rSV' as shown in the central lower side of the figure so as to obtain coordinates (ru', rv') of the point Gq of the target eigenvector space rSV'.

Since the respective eigenvectors of the eigenvector space rSV and the target eigenvector space rSV' are obtained by the components of L, $\alpha$ and $\beta$ of the L$\alpha\beta$ space, the component of the eigenvector ru' of the point Gq may be obtained from the component of the eigenvector ru and the eigenvector ry of the point Gq. Similarly, the component of the eigenvector rv' of the point Gq may be obtained from the component of the eigenvector ru and the eigenvector ry of the point Gq. Thus, the coordinates (ru', rv') of the point Gq of the target eigenvector space rSV' may be obtained.

The position specifying unit 53 obtains the position of the target eigenvector space SV' of the point Gq represented by the coordinates (ru', rv') of the target eigenvector space rSV'. As a result, for example, it is assumed that a point Gp' represented by coordinates (u', v') is obtained as a point of the target eigenvector space SV' corresponding to the point Gq.

If the coordinates (u', v') of the point Gp' of the target eigenvector space SV' may be obtained, the position specifying unit 53 calculates the values of the components of L, α and β of the Lαβ space of the point Gp' from that coordinate, as the pixel values of the pixel after mapping.

In this way, the position specifying unit 53 normalizes (unifies) the eigenvector space SV and the target eigenvector space SV'. The position specifying unit 53 obtains position correspondence between the eigenvector space rSV and target eigenvector space rSV' obtained as the result so as to perform coordinates conversion (mapping process) between the eigenvector space SV and the target eigenvector space SV' of the pixel Gp, thereby obtaining the pixel Gp'.

By normalizing the eigenvector space, each point of the eigenvector space SV may be linearly mapped to a point of the eigenvector space rSV. Thus, coordinate conversion between the eigenvector space SV and the target eigenvector space SV' may be performed such that a relative positional relationship between the pixels of the eigenvector space SV becomes the same positional relationship even in the target eigenvector space SV' after mapping. As a result, it is possible to obtain a converted image in which the relative relationship between the pixel value of a pixel of each position and the pixel value of an adjacent pixel becomes the same relationship as the original image and to realize tone correction without corruption.

For example, when the original image is converted into the converted image, it is assumed that the pixel values of two pixels are converted from pixel values R1 and R2 into pixel values R1' and R2'. At this time, the mapping process of the pixel values is performed such that $R1'/R1=R2'/R2$ is satisfied with respect to the pixel values before and after conversion. Then, for example, a gradation-shaped region on the original image necessarily becomes a gradation shape even on the converted image after conversion, and the color distribution of the pixels may be changed to a desired distribution while maintaining the relative relationship between the pixel values of the pixels of the image.

The process of normalizing the eigenvector space so as to perform coordinate conversion, which is described with reference to FIG. 8, may be applied to a space of certain dimensions equal to or greater than two dimensions.

Figure 7:
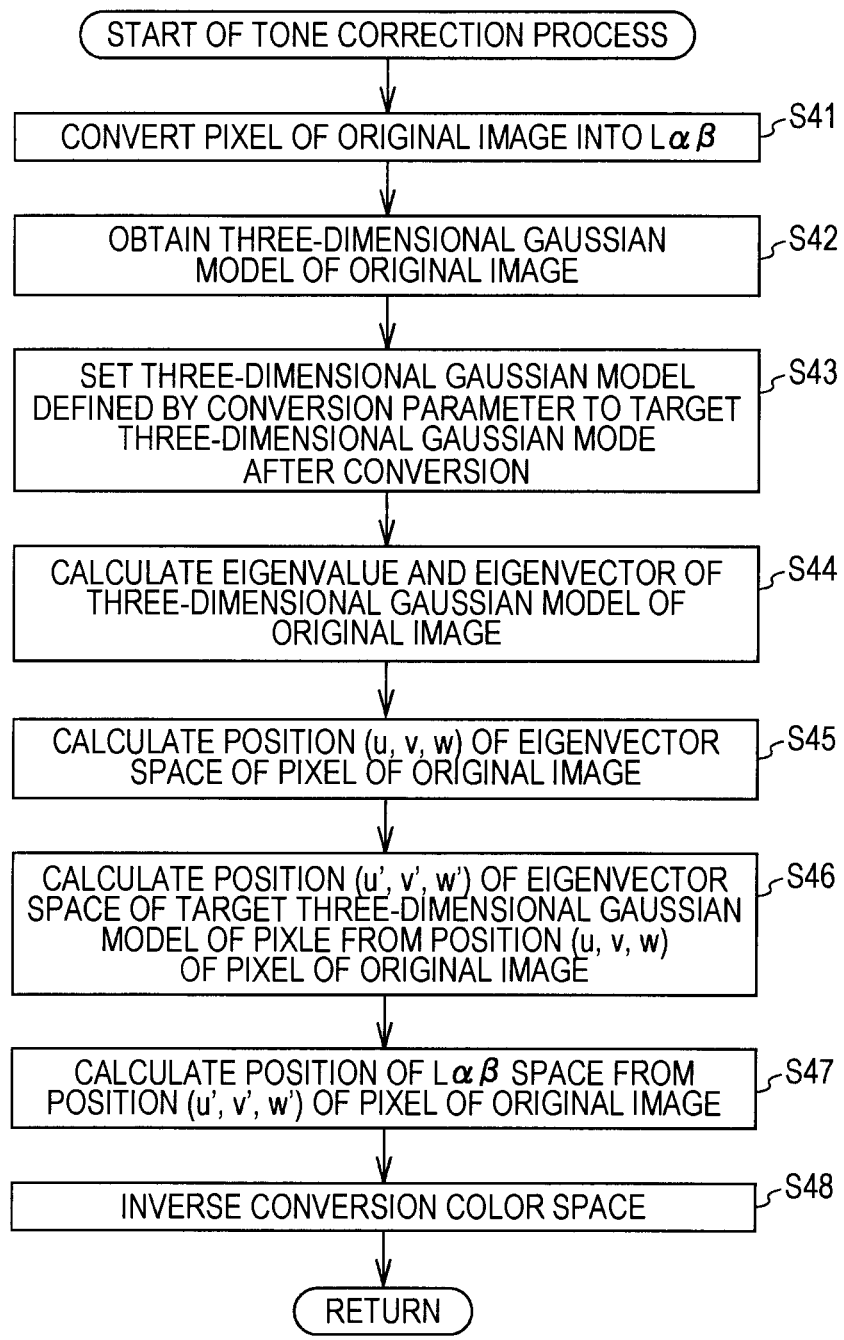
FIG. 7 is a flowchart illustrating a tone correction process.

Returning to the description of the flowchart of FIG. 7, in step S47, if the converted image of the color distribution represented in the target three-dimensional Gaussian model is obtained, the position specifying unit 53 supplies the obtained converted image to the color space inverse conversion unit 54 and the process proceeds to step S48.

In step S48, the color space inverse conversion unit 54 inversely converts the pixel value of each pixel of the converted image supplied from the position specifying unit 53 from the pixel value of the Lαβ space into the pixel value of the RGB space. Thus, it is possible to obtain a converted image in which each pixel has values of components of R, G and B as a pixel value. If the inverse conversion of the color space is performed, the color space inverse conversion unit 54 supplies the obtained converted image to the reproduction unit 23 and the tone correction process is finished. If the tone correction process is finished, thereafter, the process proceeds step S15 of FIG. 5.

In this way, the image conversion unit 24 performs tone correction with respect to the original image using the conversion parameter suitable to the circumstances and generates a converted image.

Accordingly, it is possible to perform tone correction with respect to the original image according to the current circumstances and to obtain a converted image having an atmosphere suitable to the circumstances of weather or time. Thus, it is possible to realize a feeling of the season or atmosphere of time. For example, it is possible to perform tone correction so as to convert a scenery photo (original image) from a daytime photo into an evening or night photo. If the converted image obtained in this way is displayed, the user views the displayed converted image so as to know the current time or weather intuitively.

Although the case of performing the tone correction process as the example of the conversion process is described, adjustment of contrast or softness of the original image, reduction of noise, conversion of a dynamic range, adjustment of brightness or color, or the like may be performed.

Description of Construction of Database of Conversion Parameters

As described above, the conversion parameter may correspond to the point (arrangement point) of the circumstance vector space or may be distributed in a region having a predetermined range. For example, in the case where the conversion parameter corresponds to the region of the circumstance vector space, the distribution of the conversion parameter is determined by using an image set which becomes teacher data (learning image).

Hereinafter, an example of construction of a database of conversion parameters in this case will be described. In addition, the conversion parameter is an average value and a covariance matrix defining a target three-dimensional Gaussian model. The three-dimensional Gaussian model represented by this conversion parameter may be calculated from only an image.

For example, Exchangeable Image File Format (Exif) information which is metadata information of an example is used to associate, for example, the conversion parameter representing the three-dimensional Gaussian model to a circumstance vector space. The Exif information is information about an image, which added to the image, and, for example, the Exif information includes an imaging date and time for an image, information on GPS position during imaging, setting information of the imaging device, and the like.

If an image (hereinafter, referred to as a learning image) for constructing the database of the conversion parameters is supplied, the reproduction unit 23 calculates a three-dimensional Gaussian model, that is, an average value and a covariance matrix, from the learning image as a conversion parameter. The reproduction unit 23 generates a circumstance vector of the conversion parameter using metadata information added to the learning image.

For example, if the circumstance vector includes two components (elements) of a value Jx representing season and a value Jy representing time, the reproduction unit 23 specifies season and time when the learning image is imaged from the metadata information of the learning image and calculates the value Jx of the season component and the value Jy of the time component of the circumstance vector. The reproduction unit 23 sets the point of the circumstance vector space specified by the obtained circumstance vector as an arrangement point and associates the arrangement point to the conversion parameter.

The learning image may be received from the outside of the image processing apparatus 11 or one recorded in the memory 22 in advance may be read by the reproduction unit 23.

By setting a previously prepared photo or each of prepared stock photos as a learning image, an arrangement point may be determined for each conversion parameter obtained from one learning image or close arrangement points in the circumstance vector space is segmented (grouped) into one group.

For example, if segmentation of the learning image is performed, the reproduction unit 23 calculates a circumstance vector with respect to each of a plurality of learning images and associates each learning image to the circumstance vector space.

Figure 9:
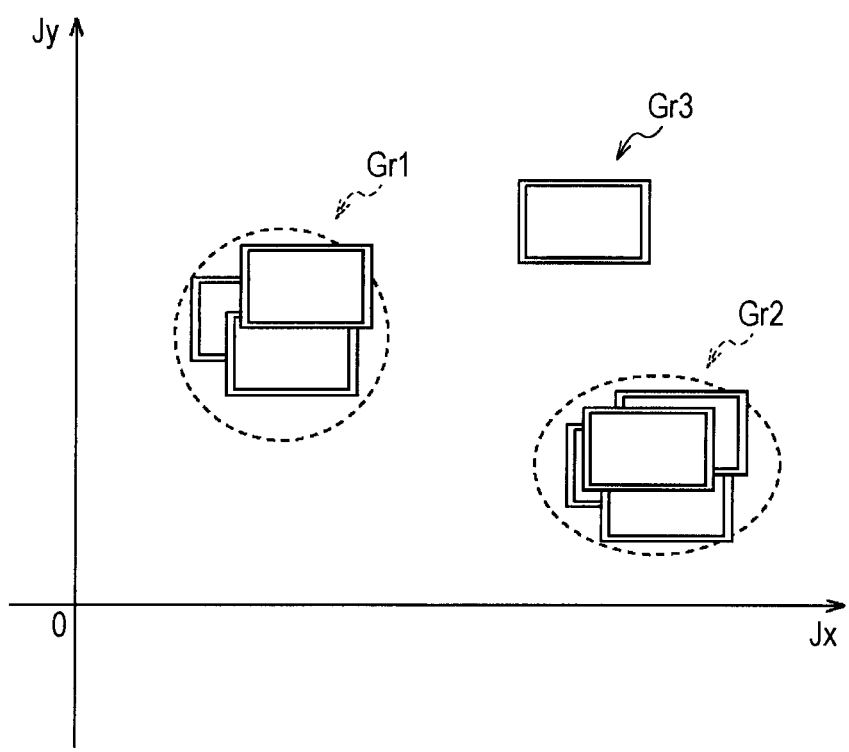
FIG. 9 is a diagram illustrating construction of a database of conversion parameters.

As a result, for example, it is assumed that the result shown in FIG. 9 is obtained. In FIG. 9, a vertical axis and a horizontal axis denote the season component Jx and the time component Jy of the circumstance vector, and a two-dimensional coordinate system including a Jx component and a Jy component having an original point O as a reference is a circumstance vector space.

In the example of FIG. 9, one rectangle represents one learning image, and such a learning image is arranged at a position of the circumstance vector space decided by the circumstance vector, that is, a coordinate position including the Jx component and the Jy component.

If each learning image is associated with the circumstance vector space, the reproduction unit 23 segments the learning images using the circumstance vector of each learning image. For example, segmentation is performed by k nearby directions or the like. In the example of FIG. 9, the learning images are grouped (segmented) into three groups Gr1 to Gr3. Each of the groups Gr1 and the group Gr2 includes a plurality of learning images and the group Gr3 includes one learning image.

The reproduction unit 23 sets a point decided by the circumstance vector of the learning image as an arrangement point and associates a conversion parameter obtained from the learning image to that arrangement point, with respect to the group Gr3 including one learning image.

The reproduction unit 23 sets a region including all points decided by the circumstance vector of the learning images as an arrangement region and associates one conversion parameter to the arrangement region, with respect to the group Gr1 including the plurality of learning images. The conversion parameter associated with the arrangement region is, for example, an average value, a weighted average value or the like of the conversion parameter of the learning images belonging to the group Gr1. Similar to the group Gr1, the reproduction unit 23 obtains an arrangement region and a conversion parameter associated with that arrangement region from the plurality of learning images, with respect to the group Gr2.

Figure 10:
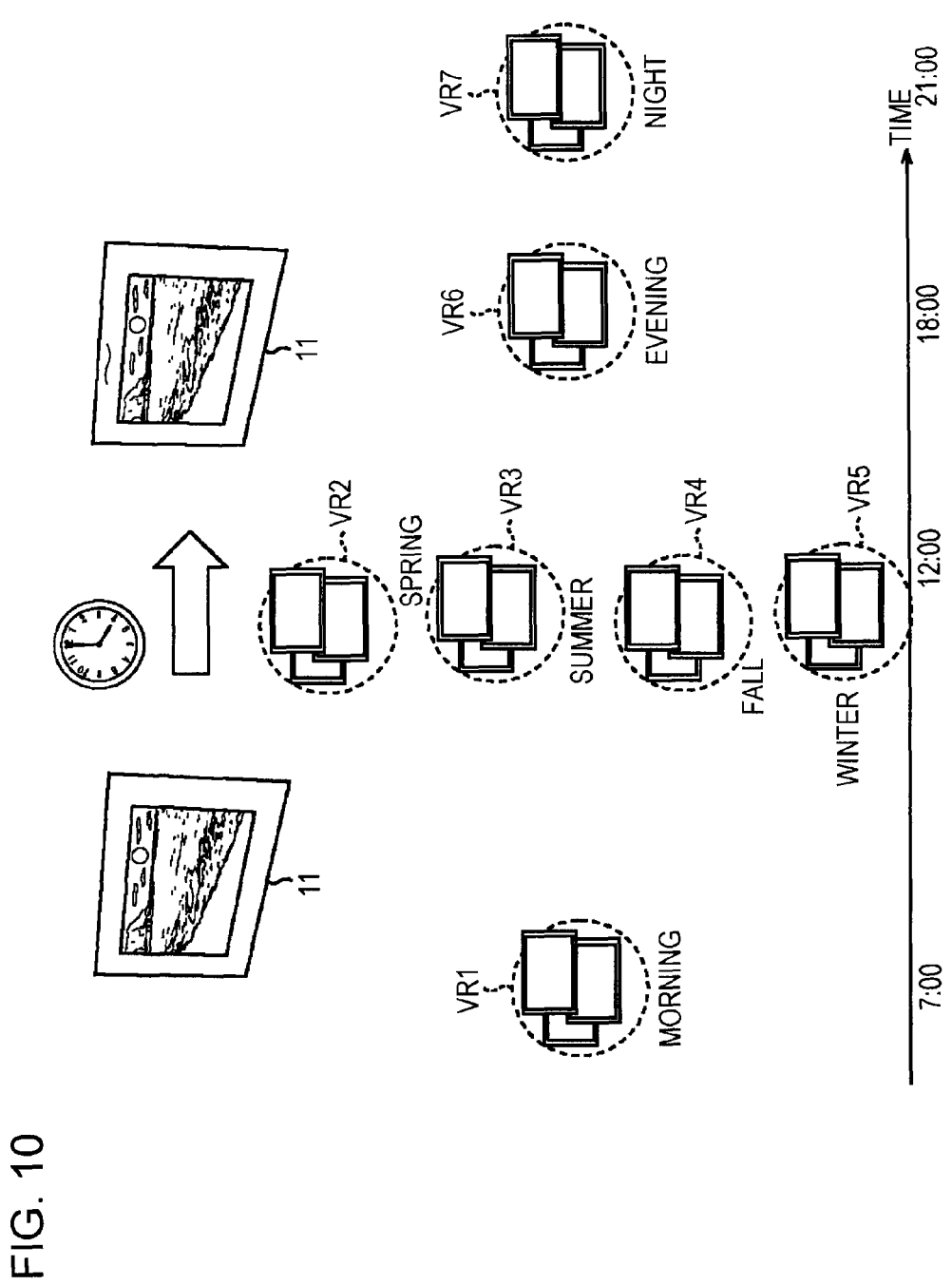
FIG. 10 is a diagram illustrating a conversion example by a conversion parameter.

The reproduction unit 23 constructs the conversion parameter associated with each arrangement point or arrangement region of the circumstance vector space from the input learning images so as to obtain, for example, as shown in FIG. 10, conversion parameters which realize tone correction according to the time or season of circumstances. In FIG. 10, a horizontal direction shows the time component Jy of the circumstance vector.

In the example of FIG. 10, a conversion parameter obtained from a learning image imaged in the morning is associated with a region VR1 of a morning time of each season of the circumstance vector space. Accordingly, if a circumstance vector included in this region VR1 is obtained, the original image is converted into an image of a tone taking on a bright yellow tinge by the conversion parameter associated with the region VR1.

Conversion parameters obtained from learning images imaged in the daytime of each season are associated with regions VR2 to VR5 of the daytime of seasons of spring, summer, fall and winter in the circumstance vector space. Accordingly, if a circumstance vector included in the regions VR2 to VR5 is obtained, the original image is subjected to tone correction by the conversion parameter associated with each of the regions VR2 to VR5.

For example, in conversion using the conversion parameter of the region VR2, the original image is converted into an image of a tone taking on a light pink tinge and, in conversion using the conversion parameter of the region VR3, the original image is subjected to tone correction such that blue is emphasized. In conversion using the conversion parameter of the region VR4, the original image is converted into an image of a tone taking on a red tinge and, in conversion using the conversion parameter of the region VR5, the original image is subjected to tone correction such that white is emphasized. In this way, the conversion parameter which emphasizes the tone of each season is associated with the region of each season of the daytime of the circumstance vector space.

A conversion parameter obtained from a learning image imaged in the night is associated with the region VR6 of the evening time of each season of the circumstance vector space. Accordingly, if a circumstance vector included in the region VR6 is obtained, the original image is converted into an image of a tone taking on a red tinge by the conversion parameter associated with the region VR6.

A conversion parameter obtained from a learning image imaged in the night is associated with the region VR7 of the night time of each season of the circumstance vector space. Accordingly, if a circumstance vector included in the region VR7 is obtained, the original image is converted into an image of a wholly dark tone with suppressed saturation by the conversion parameter associated with the region VR7.

In this way, the reproduction unit 23 constructs and records the database of the conversion parameters from the learning images and uses the obtained conversion parameters for conversion of the original image into the converted image.

When the database of the conversion parameters is constructed, only usable images may be selected from a predetermined image set as the learning image so as to construct the database. In this case, for example, if the reproduction unit 23 or the user selects only images with good appearance so as to construct the database, it is possible to obtain a converted image with better appearance by tone correction of the original image using the conversion parameter.

Second Embodiment

Configuration of Image Conversion Unit

A geometric change process may be performed as a conversion process using a conversion parameter. In this case, the image conversion unit 24 of FIG. 3 is, for example, configured as shown in FIG. 11.

Figure 11:
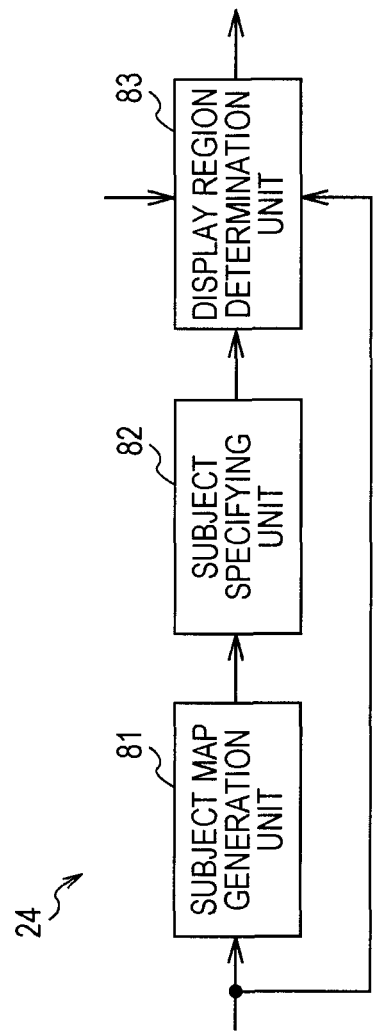
FIG. 11 is a diagram showing a configuration example of an image conversion unit.

The image conversion unit 24 shown in FIG. 11 includes a subject map generation unit 81, a subject specifying unit 82 and a display region determination unit 83.

The subject map generation unit 81 generates a subject map representing region likeness of a subject in each region of the original image based on the original image supplied from the reproduction unit 23 and supplies the subject map to the subject specifying unit 82. The term "subject" described herein refers to an object on the original image in which a user is estimated to be interested, for example, an object in which the user is assumed to be interested, such as an object of more color regions located in a central portion or a focused region.

The subject specifying unit 82 specifies the region of the subject on the original image using the subject map supplied from the subject map generation unit 81 and supplies the specified result to the display region determination unit 83. The display region determination unit 83 crops a specific region including the subject on the original image using the specified result of the subject supplied from the subject specifying unit 82 and the original image and the conversion parameter from the reproduction unit 23, sets the specific region as a converted image, and supplies the specific region to the reproduction unit 23.

Description of Image Conversion Process

Even in the case where the image conversion unit 24 is configured as shown in FIG. 11, if the user instructs the display of the original image in a state in which an automatic conversion mode is set, the image processing apparatus 11 performs an image conversion process and displays the converted image obtained from the original image in a slide show mode.

Figure 12:
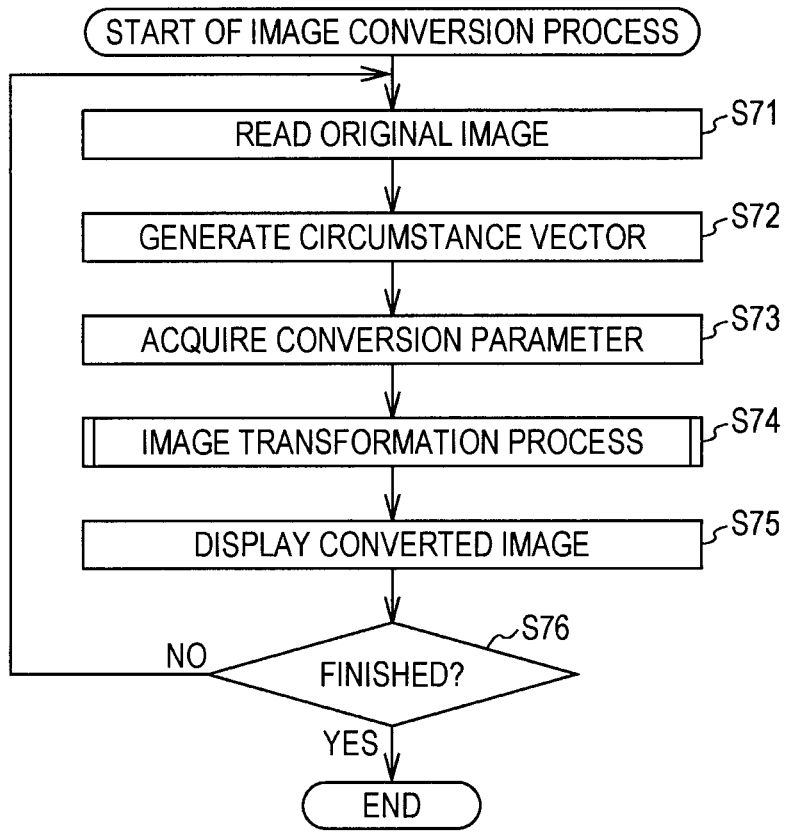
FIG. 12 is a flowchart illustrating an image conversion process.

Hereinafter, the image conversion process of the case where the image conversion unit 24 is configured as shown in FIG. 11 will be described with reference to the flowchart of FIG. 12.

The processes of step S71 to step S73 are equal to the processes of step S11 to step S13 of FIG. 5 and thus the description thereof will be omitted. The conversion parameter acquired by the reproduction unit 23 is, for example, an enlargement factor for specifying a region in which a converted image is displayed on the original image, and the like.

If the conversion parameter is acquired in step S73, the reproduction unit 23 supplies the original image to the subject map generation unit 81 and the display region determination unit 83 and supplies the conversion parameter to the display region determination unit 83.

In step S74, the image conversion unit 24 performs an image transformation process. Although details of the image transformation process will be described below, in this image transformation process, the conversion parameter is used and the original image is geometrically changed so as to generate a converted image.

If the converted image is generated, thereafter, the processes of step S75 and step S76 are performed and the image conversion process is finished. However, such processes are equal to the processes of step S15 and step S16 of FIG. 5 and thus the description thereof will be omitted.

In this way, the image processing apparatus 11 acquires information indicating circumstances, generates a circumstance vector, and selects a conversion parameter suitable for current circumstance using the circumstance vector. The image processing apparatus 11 geometrically changes the original image using the conversion parameter and displays the obtained converted image.

Accordingly, the image processing apparatus 11 may specify a conversion parameter according to the circumstances without enabling a user to perform a certain operation and may change an original image according to the circumstances such as time, a viewing distance, or the like using this conversion parameter.

For example, if a distance between the user and the image processing apparatus 11 is identified from an image captured using a camera as information indicating circumstance, the subject is enlarged and displayed when the user is separated, that is, the original image is changed according to circumstances such as the viewing distance of the user. Thus, it is possible to more efficiently display the original image. For example, if a huge original image such as a panoramic image is displayed, it is possible to realize a slide show with a relaxed atmosphere if a background region without a subject of the original image is centrally displayed.

Description of Image Transformation Process

Next, the image transformation process corresponding to the process of step S74 of FIG. 12 will be described with reference to the flowchart of FIG. 13.

In step S101, the subject map generation unit 81 generates the subject map using the original image supplied from the reproduction unit 23 and supplies the subject map to the subject specifying unit 82.

For example, the subject map generation unit 81 extracts a feature amount of a feature of each region of the original image for each feature such as luminance, color, edge or the like of the original image and generates a feature amount map representing subject likeness of each region of the original image from the extracted feature amount.

The feature amount map is information (image) representing a difference between the luminance of a predetermined position of the original image and the average luminance of adjacent region of that position, if the feature is luminance. In general, since a region, a difference in luminance the periphery of which is large, of an image attracts a person who views the image, the probability that the region is a subject region is high. Accordingly, in the feature amount map in which luminance is set as the feature, a larger difference in luminance, that is, a pixel having a large pixel value, represents a region having a higher probability of being a subject region. Similarly, even in the feature amount map of another feature, a pixel having a larger pixel value represents a more subject-like region.

The subject map generation unit 81 weighted-adds a plurality of feature amount maps obtained in this way using a predetermined weight and generates the subject map. That is, the pixel value of the pixel located at the same position of each feature amount map is weighted-added to become the pixel value of the pixel of the subject map.

The subject map generation unit 81 binarizes the pixel value of each pixel of the obtained subject map by a predetermined threshold value as a final subject map. That is, if the pixel value of the pixel of the subject map is equal to or greater than the threshold value, the final pixel value of the pixel is "1" and, if the pixel value is less than the threshold value, the final pixel value of the pixel is "0". Accordingly, in the subject map, a region including a pixel with a pixel value of "1" is regarded as a subject region.

Figure 14:
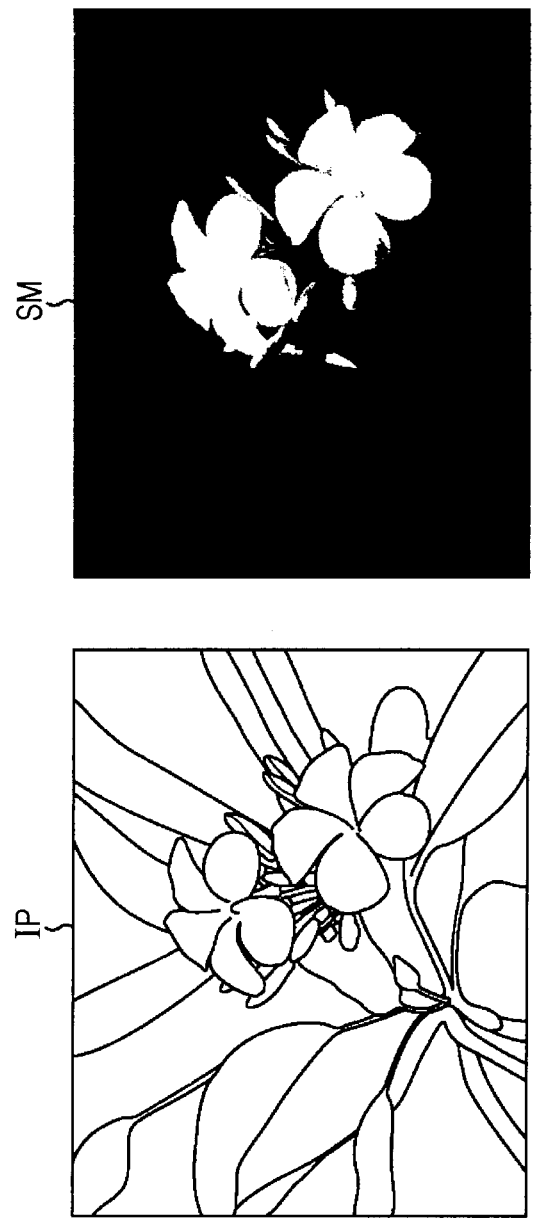
FIG. 14 is a diagram illustrating a subject map.

For example, if the above-described process is performed using an original image IP shown in FIG. 14, a subject map SM of a binary image, which is shown on the right side of the figure, may be obtained. In the example of FIG. 14, a flower is displayed in substantially the center of the original image IP, and the pixel value of the pixel of the same position as the flower of the original image IP is "1" in the subject map SM obtained from the original image IP. To this end, in subject detection using the subject map SM, a flower region is specified as a subject region.

The method of generating the subject map is, for example, described in "Learning to Detect A Salient Object, Tie Liu, Jian Sun, Nan-Ning Zheng, Xiaoou Tang, Heung-Yeung Shum, Computer Vision and Pattern Recognition, 2007. CVPR '07. IEEE Conference on Publication Date: 17-22 Jun. 2007".

Figure 13:
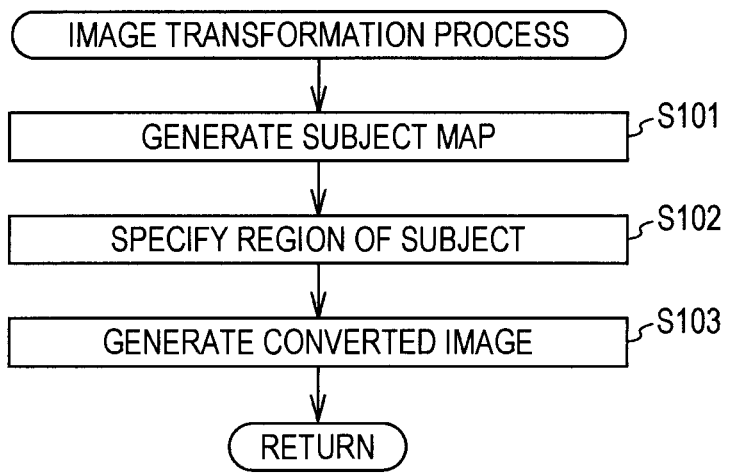
FIG. 13 is a flowchart illustrating an image transformation process.

Returning to the description of the flowchart of FIG. 13, in step S102, the subject specifying unit 82 specifies a subject region of the original image using the subject map supplied from the subject map generation unit 81.

For example, the subject specifying unit 82 sets a region including a plurality of adjacent pixels each having a pixel value of "1" as a subject region in the subject map and specifies a minimum rectangular region (hereinafter, referred to as a minimum rectangular region) surrounding the subject region.

The subject specifying unit 82 acquires display region information representing the aspect ratio of the converted image. For example, the display region information may be recorded in the subject specifying unit 82 in advance or physical information such as the size of a display screen of the image display unit 25 or screen setting information for dividing another information and a screen and displaying a converted image or the like may be acquired from the image display unit 25 or the like so as to calculate the aspect ratio of the converted image.

The subject specifying unit 82 obtains the aspect ratio of the minimum rectangular region of the subject map, enlarges the minimum rectangular region in a vertical direction or a horizontal direction such that the aspect ratio of the minimum rectangular region becomes equal to the aspect ratio of the converted image, and performs adjustment of the aspect ratio. The subject specifying unit 82 sets a region of the original image located at the same location as the minimum rectangular region after aspect ratio adjustment as a subject display region and supplies information indicating the subject display region to the display region determination unit 83.

Upon aspect ratio adjustment, the subject specifying unit 82 fundamentally enlarges the minimum rectangular region using the center of the minimum rectangular region as a base point. However, if the minimum rectangular region after adjustment exceeds the subject map, the minimum rectangular region is enlarged in a state of being shifted the base point.

In step S103, the display region determination unit 83 generates the converted image using the information indicating the subject display region supplied from the subject specifying unit 82 and the conversion parameter from the reproduction unit 23.

For example, as shown on the left side of FIG. 15, on the subject map SM, a region which is slightly shifted from the center to the right is regarded as a minimum rectangular region MR and a region DR having a specific aspect ratio surrounding the minimum rectangular region MR and, more particularly, a region of the original image located on the same location as the region DR is a subject display region.

In this case, the display region determination unit 83 sets a region having a specific aspect ratio from a region ER1, a specific aspect ratio of which is largest, to the region DR and, more particularly, a region of the original image located at the same position as that region, on the subject map SM as a converted image.

That is, as the region within the region ER1, a region including the region DR is a converted image region. In the example of FIG. 15, since the aspect ratio of the subject map SM, that is, the original image is equal to the aspect ratio of the converted image, the entire region of the subject map SM is a region ER1.

The converted image region is determined by the conversion parameter. In particular, the enlargement factor of the conversion parameter has a value from "0.0" to "1.0". In this case, if the enlargement factor is "0.0", the region DR is the converted image region and, if the enlargement factor is "1.0", the region ER1 is the converted image region.

If the enlargement factor has a value from "0.0" to "1.0", as a region having a size determined by that value and having a specific aspect ratio, a region within the region ER1 including the region DR is the converted image region. For example, if the enlargement factor is "0.5", a region ER2 within the region ER1 including the region DR in the figure is the converted image region. Here, since the enlargement factor "0.5" is half the enlargement factor "1.0", the size of the region ER2 is the size between (average value) the region DR and the region ER1.

The process of setting the region, in which the converted image is displayed, to the region having the size determined by the enlargement factor is a process of enlarging the region DR with a scale factor according to the enlargement factor. The enlargement of the region DR is fundamentally performed using the central position of the region DR as the base point. However, if the region DR exceeds the subject map SM by enlargement, the enlargement process is performed while being sifted from the base point position such that the region DR after enlargement, that is, the converted image region, does not exceed the subject map SM.

For example, if the region DR, the region ER2 and the region ER1 are specified by the enlargement factor as the conversion parameter, the region of the original image located at the same position as such regions is the converted image. Thus, as shown on the right side of the figure, it is possible to obtain a converted image OP1, a converted image OP2 and a converted image OP3.

For example, the converted image OP1 obtained in the case where the enlargement factor is "0.0", that is, in the case where the region DR is the converted image region, the flower as the subject is largely displayed in the image. In particular, the image obtained by enlarging the region of the original image located at the same position as the region DR to the same size as the display screen of the image display unit 25 is the converted image OP1.

For example, the converted image OP3 obtained in the case where the enlargement factor is "1.0", that is, in the case where the region ER1 is the converted image region, the flower as the subject is displayed to be smaller than that of the converted image OP1 such that the subject located in the vicinity of the flower is also displayed.

In the case where the distance from the image processing apparatus 11 to the user, that is, the viewing distance, is obtained as the circumstance vector, if the enlargement factor is determined according to the viewing distance, the subject is displayed in small when the viewing distance is short. That is, the subject may be displayed with a size suitable for the viewing distance.

In order to obtain the viewing distance as the circumstance vector, for example, the camera functioning as the circumstance acquisition unit 21 captures the image of the front of the image processing apparatus 11, detects a person's face from the image obtained by the circumstance acquisition unit 21, and obtains a viewing distance from the size of the detected face.

If the converted image is obtained in this way, the display region determination unit 83 supplies the obtained converted image to the reproduction unit 23 and the image transformation process is finished. If the image transformation process is finished, thereafter, the process proceeds to step S75 of FIG. 12.

In this way, the image conversion unit 24 crops a region having a size decided by the conversion parameter, which includes the subject of the original image, and sets the region as a converted image, thereby converting (changing) the original image into the converted image. Thus, it is possible to display the subject with a size according to the circumstances.

Although the case where the region of the subject having the size according to the enlargement factor is the converted image as the geometric change process of the original image is described in the above description, the invention is not limited to enlargement or reduction of the region of the subject, and rotation of the image, a combination thereof or the like may be considered. In addition, a process of cropping a region having a shape decided by a conversion parameter from the original image and setting the region as a converted image or a change process using advanced image processing such as mesh warping or seam carving may be performed. For example, as a region including a subject of the original image, a region having a size and shape decided by a conversion parameter may be cropped and regarded as a converted image.

Third Embodiment

Configuration of Image Conversion Unit

Although an example in which only any one of the tone correction process or change process is performed as the conversion process of converting the original image into the converted image is described in the above description, both the processes may be performed.

Figure 16:
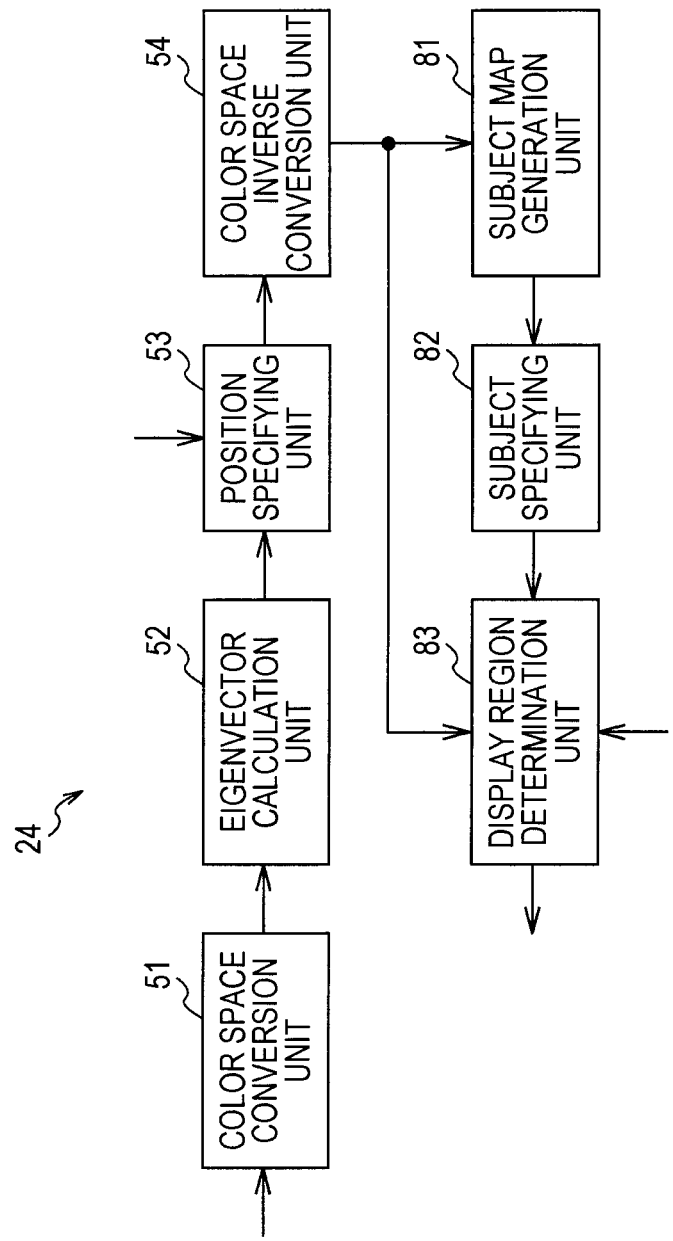
FIG. 16 is a diagram showing a configuration example of an image conversion unit.

In this case, the image conversion unit 24 of the image processing apparatus 11 is, for example, configured as shown in FIG. 16.

The image conversion unit 24 of FIG. 16 includes a color space conversion unit 51, an eigenvector calculation unit 52, a position specifying unit 53, a color space inverse conversion unit 54, a subject map generation unit 81, a subject specifying unit 82 and a display region determination unit 83. In FIG. 16, portions corresponding to those of FIGS. 4 and 11 are denoted by the same reference numerals and the description thereof will be appropriately omitted.

In the image conversion unit 24 of FIG. 16, the subject map generation unit 81 to the display region determination unit 83 shown in FIG. 11 are connected to the next stage of the color space conversion unit 51 to the color space inverse conversion unit 54 shown in FIG. 4. In the image conversion unit 24, the original image from the reproduction unit 23 is supplied to the color space conversion unit 51 and the conversion parameter from the reproduction unit 23 is supplied to the position specifying unit 53 and the display region determination unit 83.

The color space inverse conversion unit 54 supplies the image after tone correction, which is obtained by the inverse conversion of the color space, to the subject map generation unit 81 and the display region determination unit 83, and the subject map generation unit 81 generates the subject map from the image after tone correction. The display region determination unit 83 generates the converted image using the result of specifying the subject supplied from the subject specifying unit 82, the image after tone correction from the color space inverse conversion unit 54, and the conversion parameter and supplies the converted image to the reproduction unit 23.

Description of Image Conversion Process

Figure 17:
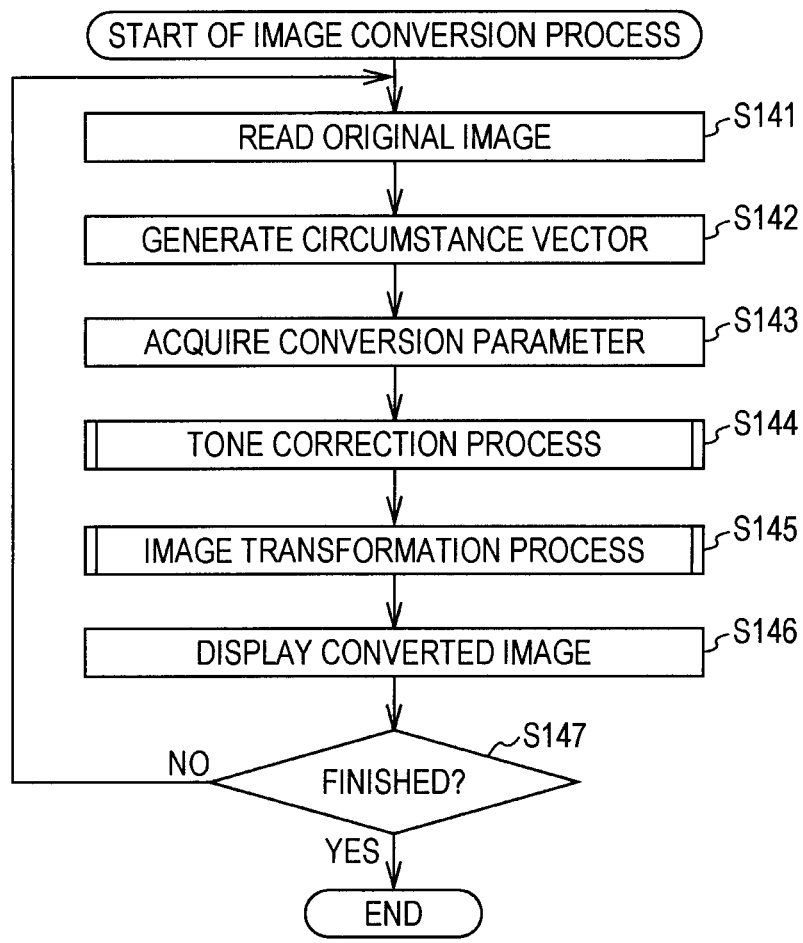
FIG. 17 is a flowchart illustrating an image conversion process.

Next, the image conversion process performed in the case where the image conversion unit 24 is configured as shown in FIG. 16 will be described with reference to the flowchart of FIG. 17.

The processes of step S141 to step S144 are equal to the processes of step S11 to step S14 of FIG. 5 and the description thereof will be omitted.

In step S143, the average value, the covariance matrix, and the enlargement factor are acquired as the conversion parameter. In the tone correction process of step S144, the original image is subjected to tone correction such that a color distribution represented in the target three-dimensional Gaussian model defined by the average value and the covariance matrix as the conversion parameter is obtained. The original image subjected to tone correction is supplied from the color space inverse conversion unit 54 to the subject map generation unit 81 and the display region determination unit 83.

Thereafter, the processes of step S145 to step S147 are performed and the image conversion process is finished. In the processes of step S145 to step S147, the same processes as step S74 to step S76 of FIG. 12 are performed.

That is, the subject map is generated from the original image subjected to tone correction and the region of the subject of the original image after color correction, which is specified by the subject map, is cropped and is regarded as the converted image. The size of the cropped region is determined by the enlargement factor as the conversion parameter.

In this way, the image processing apparatus 11 performs the tone correction process and the image transformation process with respect to the original image using the conversion parameter and generates the converted image.

The above-described series of processes may be executed by hardware or software. If the series of processes is executed by software, a program configuring the software is installed in a computer in which dedicated hardware is mounted or, for example, a general-purpose personal computer which is capable of executing a variety of functions by installing various types of programs, from a program recording medium.

Figure 18:
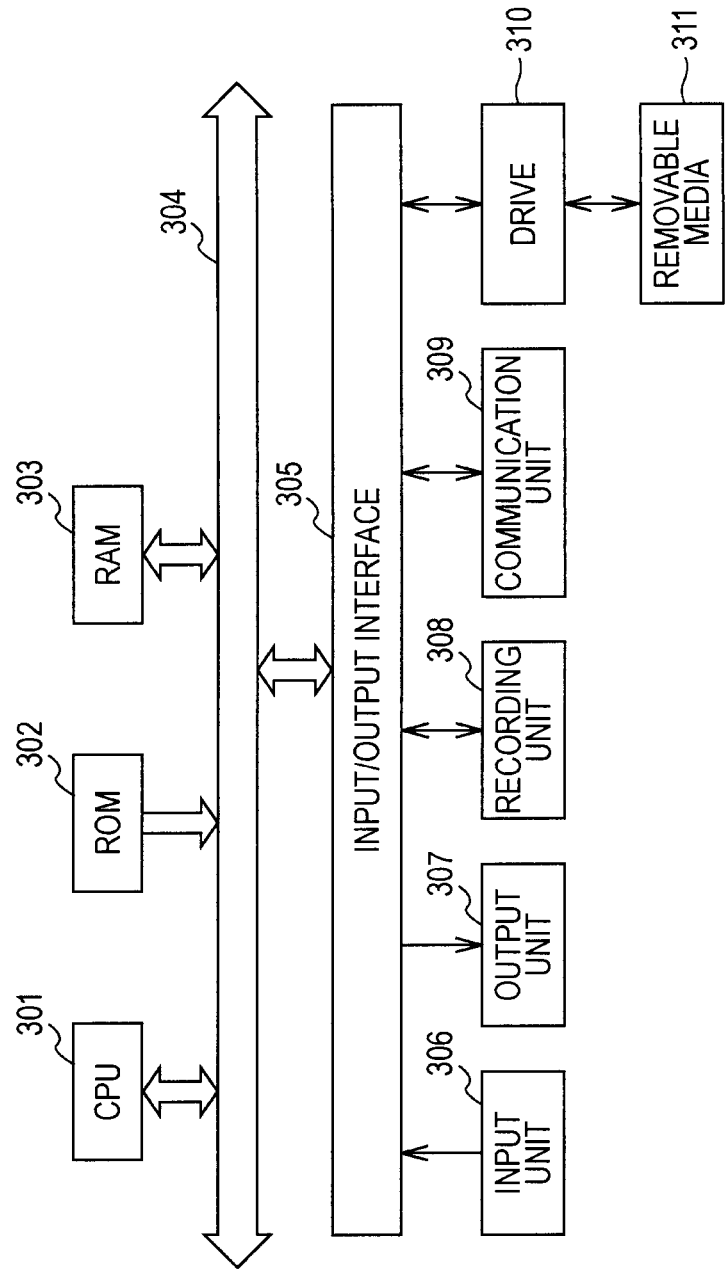
FIG. 18 is a block diagram showing a configuration example of a computer.

FIG. 18 is a block diagram showing the hardware configuration example of a computer for executing the above-described series of processes by a program.

In the computer, a Central Processing Unit (CPU) 301, a Read Only Memory (ROM) 302 and a Random Access Memory (RAM) 303 are connected to each other by a bus 304.

An input/output interface 305 is connected to the bus 304. An input unit 306 including a keyboard, a mouse, a microphone and the like, an output unit 307 including a display, a speaker and the like, a recording unit 308 including a hard disk, non-volatile memory and the like, a communication unit 309 including a network interface and the like, and a drive 310 for driving a removable media 311 such as a magnetic disk, an optical disc, a magneto-optical disc and a semiconductor memory are connected to the input/output interface 305.

In the computer having the above configuration, the CPU 301 loads and executes, for example, the program recorded on the recording unit 308 to the RAM 303 through the input/output interface 305 and the bus 304, thereby performing the above-described series of processes.

The program executed by the computer (CPU 301) is recorded, for example, on the removable media 311 which is a package media including a magnetic disk (including a flexible disk), an optical disc (a Compact Disc-Read Only Memory (CD-ROM), a Digital Versatile Disc (DVD), or the like), a magneto-optical disc, a semiconductor memory or the like, or is provided through a wired or wireless transfer medium such as a local area network, the Internet and a digital satellite broadcast.

The program may be installed in the recording unit 308 through the input/output interface 305 by mounting the removable media 311 in the drive 310. The program may be received by the communication unit 309 through the wired or wireless transfer medium and installed in the recording unit 308. The program may be installed in the ROM 302 or the recording unit 308 in advance.

The program executed by the computer may be a program for performing a process in time series in order described in the present specification or a program for performing a process at necessary timings such as upon calling or in parallel.

The present application contains subject matter related to that disclosed in Japanese Priority Patent Application JP 2010-065116 filed in the Japan Patent Office on Mar. 19, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a circumstance vector generation means for acquiring information indicating circumstances, to digitize the information, and to generate a circumstance vector;
   a conversion parameter calculation means for weighted-adding several conversion parameters specified by the circumstance vector among a plurality of previously prepared conversion parameters for image conversion; and
   a converted image generation means for performing image conversion using the conversion parameters obtained by the weighted-adding with respect to an original image to be processed so as to generate a converted image.

2. The image processing apparatus according to claim 1, wherein the converted image generation means performs at least one of a tone correction process or a geometric change process as the image conversion.

3. The image processing apparatus according to claim 2, wherein:
   the conversion parameters are information indicating a target color distribution, and
   the converted image generation means generates the converted image by performing tone correction with respect to the original image such that a color distribution of the original image becomes the target color distribution.

4. The image processing apparatus according to claim 3, wherein:
   the information indicating the target color distribution includes information defined by a target three-dimensional Gaussian model, and
   the converted image generation means obtains a position of a normalized target eigenvector space of the target three-dimensional Gaussian model, which corresponds to a position of a target pixel of the original image of a normalized eigenvector space of a three-dimensional Gaussian model representing the color distribution of the original image and specifies a position of the target pixel of the target eigenvector space before normalization from that position so as to calculate a pixel value of the target pixel after the tone correction.

5. The image processing apparatus according to claim 3, wherein the conversion parameter calculation unit records a database including the conversion parameters and positional information representing positions or regions, with which the conversion parameters are associated, in the circumstance vector space including the circumstance vector, and weighted-adds the conversion parameters, with which a predetermined number of positions or regions are associated, located in vicinity of an end point of the circumstance vector generated by the circumstance vector generation means, among positions or regions represented by the positional information.

6. The image processing apparatus according to claim 5, wherein the conversion parameter calculation means generates information indicating the target color distribution based on learning images with metadata as the conversion parameters, generates the circumstance vector from the metadata, and associates the conversion parameters obtained from the learning images with the positions or regions of the circumstance vector space specified by the circumstance vector.

7. The image processing apparatus according to claim 5, wherein the conversion parameter calculation means specifies the weighted-added conversion parameters using the circumstance vector in which weighting is applied to each component.

8. The image processing apparatus according to claim 2, wherein the converted image generation means includes:
   a subject map generation means for extracting a feature amount of a predetermined feature from the original image and to generate a subject map representing subject likeness of each region of the original image;
   a subject specifying means for specifying a subject region including a subject of the original image using the subject map; and
   a display region determination means for cropping a region of the original image including the subject region and having a size or shape decided by the conversion parameters and to set the region as the converted image.

9. An image processing method of an image processing apparatus including a circumstance vector generation means for acquiring information indicating circumstances, to digitize the information, and to generate a circumstance vector,
   a conversion parameter calculation means for weighted-adding several conversion parameters specified by the circumstance vector among a plurality of previously prepared conversion parameters for image conversion, and
   a converted image generation means for performing image conversion using the conversion parameters obtained by the weighted-adding with respect to an original image to be processed so as to generate a converted image, the image processing method comprising the steps of:
   causing the circumstance vector generation means to generate the circumstance vector;
   causing the conversion parameter calculation means to weighted-add the conversion parameters specified by the circumstance vector; and
   causing the converted image generation means to generate the converted image by the image conversion using the conversion parameters obtained by the weighted-adding.

10. A non-transitory computer-readable medium embodied with a program, which when executed by a computer, causes the computer to perform a method comprising:
   acquiring information indicating circumstances, digitizing the information, and generating a circumstance vector;
   weighted-adding several conversion parameters specified by the circumstance vector among a plurality of previously prepared conversion parameters for image conversion; and
   performing image conversion using the conversion parameters obtained by the weighted-adding with respect to an original image to be processed so as to generate a converted image.

11. An image processing apparatus comprising:
- a circumstance vector generation unit configured to acquire information indicating circumstances, to digitize the information, and to generate a circumstance vector;
- a conversion parameter calculation unit configured to weighted-add several conversion parameters specified by the circumstance vector among a plurality of previously prepared conversion parameters for image conversion; and
- a converted image generation unit configured to perform image conversion using the conversion parameters obtained by the weighted-adding with respect to an original image to be processed so as to generate a converted image.

* * * * *